(12) United States Patent
Kim et al.

(10) Patent No.: US 12,373,064 B2
(45) Date of Patent: Jul. 29, 2025

(54) SENSOR DEVICE AND DISPLAY DEVICE INCLUDING THE SAME

(71) Applicant: Samsung Display Co., Ltd., Yongin-Si (KR)

(72) Inventors: Jin Woo Kim, Yongin-si (KR); Ja Seung Ku, Yongin-si (KR); Jung Ha Son, Yongin-si (KR); Dong Chun Lee, Yongin-si (KR); Jin Taek Hong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/367,481

(22) Filed: Sep. 13, 2023

(65) Prior Publication Data

US 2024/0310956 A1  Sep. 19, 2024

(30) Foreign Application Priority Data

Mar. 17, 2023 (KR) .................. 10-2023-0035209

(51) Int. Cl.
*G06F 3/041* (2006.01)
*G06F 3/044* (2006.01)

(52) U.S. Cl.
CPC ...... *G06F 3/04184* (2019.05); *G06F 3/04166* (2019.05); *G06F 3/0446* (2019.05); *G06F 2203/04107* (2013.01)

(58) Field of Classification Search
CPC .......................... G06F 3/0443; G06F 3/0446
See application file for complete search history.

(56) References Cited

U.S. PATENT DOCUMENTS

| | | | |
|---|---|---|---|
| 9,766,755 B2* | 9/2017 | Seo | G06F 3/04166 |
| 9,785,217 B2* | 10/2017 | Schwartz | G06F 1/3206 |
| 10,572,055 B2 | 2/2020 | Shin | |
| 2014/0092031 A1* | 4/2014 | Schwartz | G06F 1/3231 345/173 |
| 2018/0011598 A1* | 1/2018 | Ku | G06F 3/04166 |
| 2018/0150176 A1* | 5/2018 | Kim | G06F 3/04164 |
| 2021/0303152 A1* | 9/2021 | Hosur | G06F 3/044 |
| 2022/0171483 A1 | 6/2022 | Yuk et al. | |
| 2022/0291782 A1 | 9/2022 | Hyun et al. | |

FOREIGN PATENT DOCUMENTS

| | | |
|---|---|---|
| KR | 10-2018-0003369 A | 1/2018 |
| KR | 10-2022-0077283 A | 6/2022 |

\* cited by examiner

*Primary Examiner* — Robin J Mishler
(74) *Attorney, Agent, or Firm* — Innovation Counsel LLP

(57) ABSTRACT

A sensor device includes: a sensor panel including sensors arranged in a matrix, and sensor lines electrically connected to the sensors on a one-to-one basis; and a sensor driver configured to receive, using a reference signal having at least two or more duty cycles, sensing signals from the sensors through the sensor lines.

20 Claims, 29 Drawing Sheets

FIG. 7A

| | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

FIG. 7B

| | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

120

SD_G

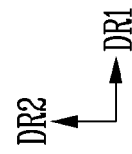

FIG. 7C

| | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

FIG. 10A

| | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

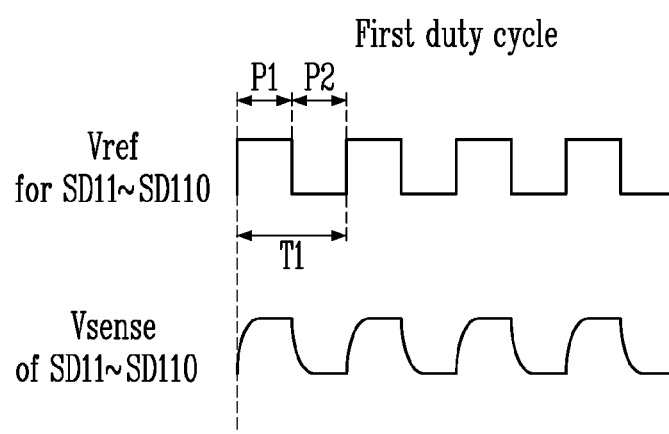

FIG. 10B

|  | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

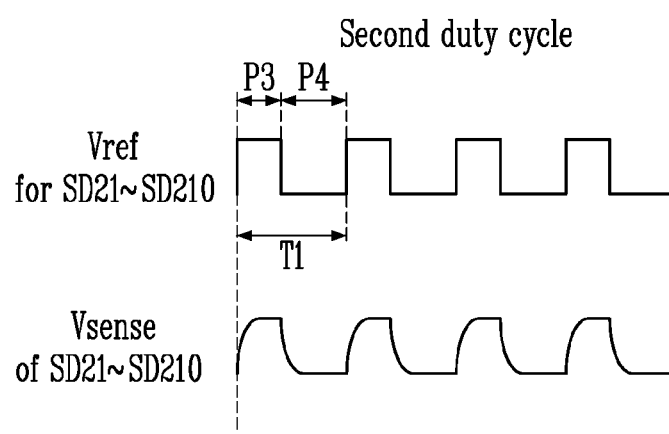

FIG. 11A

|  | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

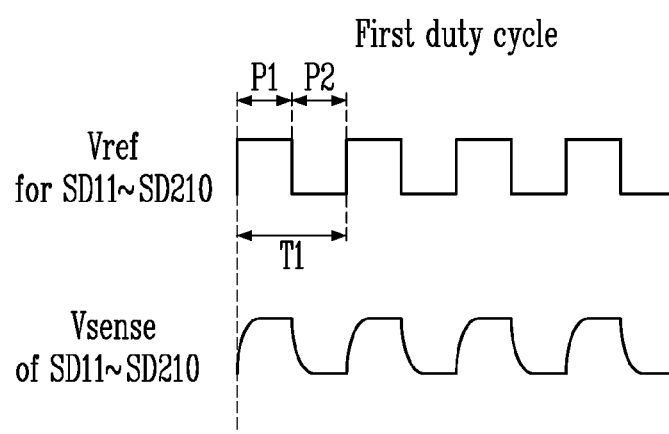

FIG. 11B

| | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

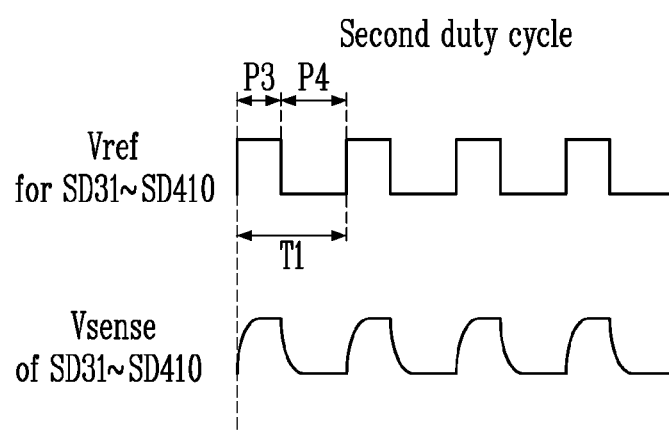

FIG. 12A

| | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

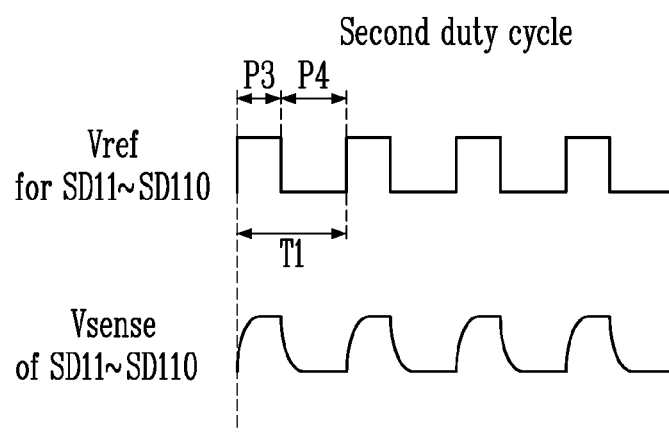

FIG. 12B

|  | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

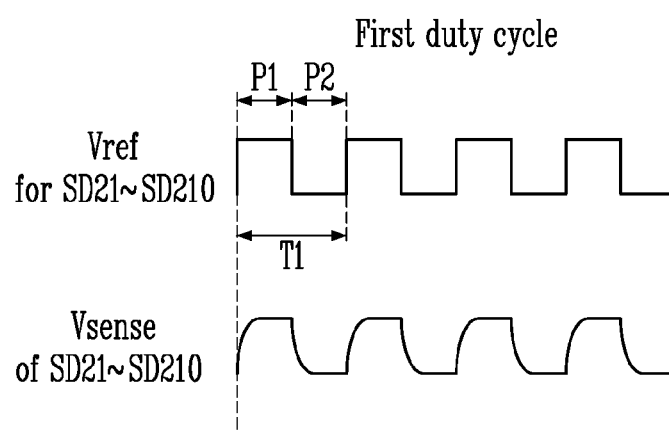

FIG. 13

| | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

120

VDRV, Vsense, VDRV

SD_ADJ, SD_G, SD_ADJ

| | COL1 | COL2 | COL3 | COL4 | COL5 | COL6 | COL7 | COL8 | COL9 | COL10 |
|---|---|---|---|---|---|---|---|---|---|---|
| ROW1 | SD11 | SD12 | SD13 | SD14 | SD15 | SD16 | SD17 | SD18 | SD19 | SD110 |
| ROW2 | SD21 | SD22 | SD23 | SD24 | SD25 | SD26 | SD27 | SD28 | SD29 | SD210 |
| ROW3 | SD31 | SD32 | SD33 | SD34 | SD35 | SD36 | SD37 | SD38 | SD39 | SD310 |
| ROW4 | SD41 | SD42 | SD43 | SD44 | SD45 | SD46 | SD47 | SD48 | SD49 | SD410 |
| ROW5 | SD51 | SD52 | SD53 | SD54 | SD55 | SD56 | SD57 | SD58 | SD59 | SD510 |
| ROW6 | SD61 | SD62 | SD63 | SD64 | SD65 | SD66 | SD67 | SD68 | SD69 | SD610 |
| ROW7 | SD71 | SD72 | SD73 | SD74 | SD75 | SD76 | SD77 | SD78 | SD79 | SD710 |
| ROW8 | SD81 | SD82 | SD83 | SD84 | SD85 | SD86 | SD87 | SD88 | SD89 | SD810 |
| ROW9 | SD91 | SD92 | SD93 | SD94 | SD95 | SD96 | SD97 | SD98 | SD99 | SD910 |
| ROW10 | SD101 | SD102 | SD103 | SD104 | SD105 | SD106 | SD107 | SD108 | SD109 | SD1010 |
| ROW11 | SD111 | SD112 | SD113 | SD114 | SD115 | SD116 | SD117 | SD118 | SD119 | SD1110 |
| ROW12 | SD121 | SD122 | SD123 | SD124 | SD125 | SD126 | SD127 | SD128 | SD129 | SD1210 |
| ROW13 | SD131 | SD132 | SD133 | SD134 | SD135 | SD136 | SD137 | SD138 | SD139 | SD1310 |
| ROW14 | SD141 | SD142 | SD143 | SD144 | SD145 | SD146 | SD147 | SD148 | SD149 | SD1410 |
| ROW15 | SD151 | SD152 | SD153 | SD154 | SD155 | SD156 | SD157 | SD158 | SD159 | SD1510 |

120

VDRV, Vsense, VDRV

SD_ADJ, SD_G, SD_ADJ

SENSOR DEVICE AND DISPLAY DEVICE INCLUDING THE SAME

CROSS-REFERENCE TO RELATED APPLICATION

The present application claims priority to Korean patent application number 10-2023-0035209 filed on Mar. 17, 2023, the entire disclosure of which is incorporated herein in its entirety by reference.

BACKGROUND

Field of Invention

Various embodiments of the present disclosure relate to a sensor device and a display device including the sensor device.

Description of Related Art

With the development of information technology, display devices, which connects a user to information, have been increasing in importance. Owing to the importance of display devices, the use of various kinds of display devices, such as a liquid crystal display device and an organic light-emitting display device, has increased.

Such a display device may include a sensor device to sense a touch of a user that corresponds to an image of the display device and use the sensed signal as an input signal. Sometimes, driving signals which are supplied to sensors of the sensor device may be used as noises in the display device, thus deteriorating display quality. Furthermore, signals for displaying an image on the display device may act as noises in the sensor device, thus reducing sensing sensitivity.

To avoid such electromagnetic interference (EMI), a change in frequency band of a driving signal of the sensor device has been proposed. However, because various frequency bands are already in use, it is difficult to figure out an additional suitable frequency band.

SUMMARY

Various embodiments of the present disclosure are directed to a sensor device and a display device including the sensor device, capable of minimizing electromagnetic interference (EMI) without changing a frequency band.

An embodiment of the present disclosure may provide a sensor device including: a sensor panel including sensors arranged in a matrix, and sensor lines electrically connected to the sensors on a one-to-one basis; and a sensor driver configured to receive, using a reference signal having at least two or more duty cycles, sensing signals from the sensors through the sensor lines.

In an embodiment, a reference signal may include a reference signal having a first duty cycle, and a reference signal having a second duty cycle different from the first duty cycle. The reference signal having the first duty cycle and the reference signal having the second duty cycle may be square waves, and may be set to have an identical period and an identical frequency.

In an embodiment, the sensor driver may receive the sensing signals from the sensors on a row basis.

In an embodiment, sensor driver may receive the sensing signals using the reference signal having different duty cycles on at least one sensing frame basis.

In an embodiment, the sensor driver may receive the sensing signals using a reference signal having a first duty cycle during a first sensing frame period, and receive the sensing signals using a reference signal having a second duty cycle different from the first duty cycle during a second sensing frame period.

In an embodiment, the sensor driver may apply a shield signal to adjacent sensors located on a row adjacent to a row from which the sensing signals are received. The shield signal may have the same waveform and phase as the reference signal supplied to the row from which the sensing signals are received.

In an embodiment, the sensor driver may receive the sensing signals using the reference signal having different duty cycles on at least one row basis.

In an embodiment, the sensor driver may apply a shield signal to adjacent sensors located on a row adjacent to a row from which the sensing signals are received. The shield signal may have the same waveform and phase as the reference signal supplied to the row from which the sensing signals are received.

In an embodiment, during a first sensing frame period, the sensing signals may be received from the sensors located on an odd-numbered row, using a reference signal having a first duty cycle, and the sensing signals may be received from the sensors located on an even-numbered row, using a reference signal having a second duty cycle different from the first duty cycle.

In an embodiment, during a second sensing frame period, the sensing signals may be received from the sensors located on the odd-numbered row, using the reference signal having the second duty cycle, and the sensing signals may be received from the sensors located on the even-numbered row, using the reference signal having the first duty cycle.

In an embodiment, the sensor panel may include a first area and a second area. The sensor driver may receive the sensing signals from the sensors in the first area, using a first reference signal having a first duty cycle, and may receive the sensing signals from the sensors in the second area, using a second reference signal having a second duty cycle different from the first duty cycle.

In an embodiment, the first area and the second area may be defined by specific columns.

In an embodiment, the sensor driver may include: an amplifier including a first input terminal electrically connected to one sensor line among the sensor line, a second input terminal to which the reference signal is to be applied, and an output terminal; and a capacitor and a switch electrically connected in parallel between the first input terminal and the output terminal of the amplifier. A sensing signal corresponding to the reference signal may be generated on the one sensor line among the sensor lines.

An embodiment of the present disclosure may provide a display device, including: a display panel configured to display an image; a sensor panel disposed on the display panel, the sensor panel including sensors arranged in a matrix, and sensor lines electrically connected to the sensors on a one-to-one basis; and a sensor driver configured to receive, using a reference signal having at least two or more duty cycles, sensing signals from the sensors through the sensor lines.

In an embodiment, the reference signal may include a reference signal having a first duty cycle, and a reference signal having a second duty cycle different from the first duty cycle. The reference signal having the first duty cycle and the reference signal having the second duty cycle may be square waves, and may be set to have an identical period and an identical frequency.

In an embodiment, the sensor driver may receive the sensing signals using the reference signal having the first duty cycle during a first sensing frame period. The sensor driver may receive the sensing signals using the reference signal having the second duty cycle during a second sensing frame period.

In an embodiment, during a first sensing frame period, the sensor driver may receive the sensing signals from the sensors located on a first row using the reference signal having the first duty cycle, and may receive the sensing signals from the sensors located on a second row using the reference signal having the second duty cycle.

In an embodiment, during a second sensing frame period, the sensor driver may receive the sensing signals from the sensors located on the first row, using the reference signal having the second duty cycle, and may receive the sensing signals from the sensors located on the second row, using the reference signal having the first duty cycle.

In an embodiment, the sensor driver may apply a shield signal to adjacent sensors located on a row adjacent to a row from which the sensing signals are received. The shield signal may have the same waveform and phase as the reference signal.

In an embodiment, the sensor panel may be divided into a first area and a second area. The sensor driver may receive the sensing signals from the sensors in the first area, using the first reference signal having the first duty cycle, and may receive the sensing signals from the sensors in the second area, using the second reference signal having the second duty cycle.

The present disclosure is not limited to the above-stated elements, and those skilled in the art will understand that variations of embodiments that are explicitly provided herein may be contemplated without departing from the scope of the claims.

BRIEF DESCRIPTION OF THE DRAWINGS

FIGS. 7A to 7C are diagrams illustrating an embodiment of the operation of the sensor device.

FIGS. 10A and 10B are diagrams illustrating an embodiment of a reference signal to be supplied in the sensor device and a sensing signal corresponding thereto.

FIGS. 11A and 11B are diagrams illustrating an embodiment of a reference signal to be supplied in the sensor device and a sensing signal corresponding thereto.

FIGS. 12A and 12B are diagrams illustrating an embodiment of a reference signal to be supplied in the sensor device and a sensing signal corresponding thereto.

FIG. 13 is a diagram illustrating an embodiment of the operation of the sensor device.

FIG. 15 is a diagram illustrating an embodiment of the operation of the sensor device.

FIG. 17 is a diagram illustrating an embodiment of the operation of the sensor device.

FIG. 19 is a diagram illustrating an embodiment of the operation of the sensor device.

DETAILED DESCRIPTION

Figure 1:
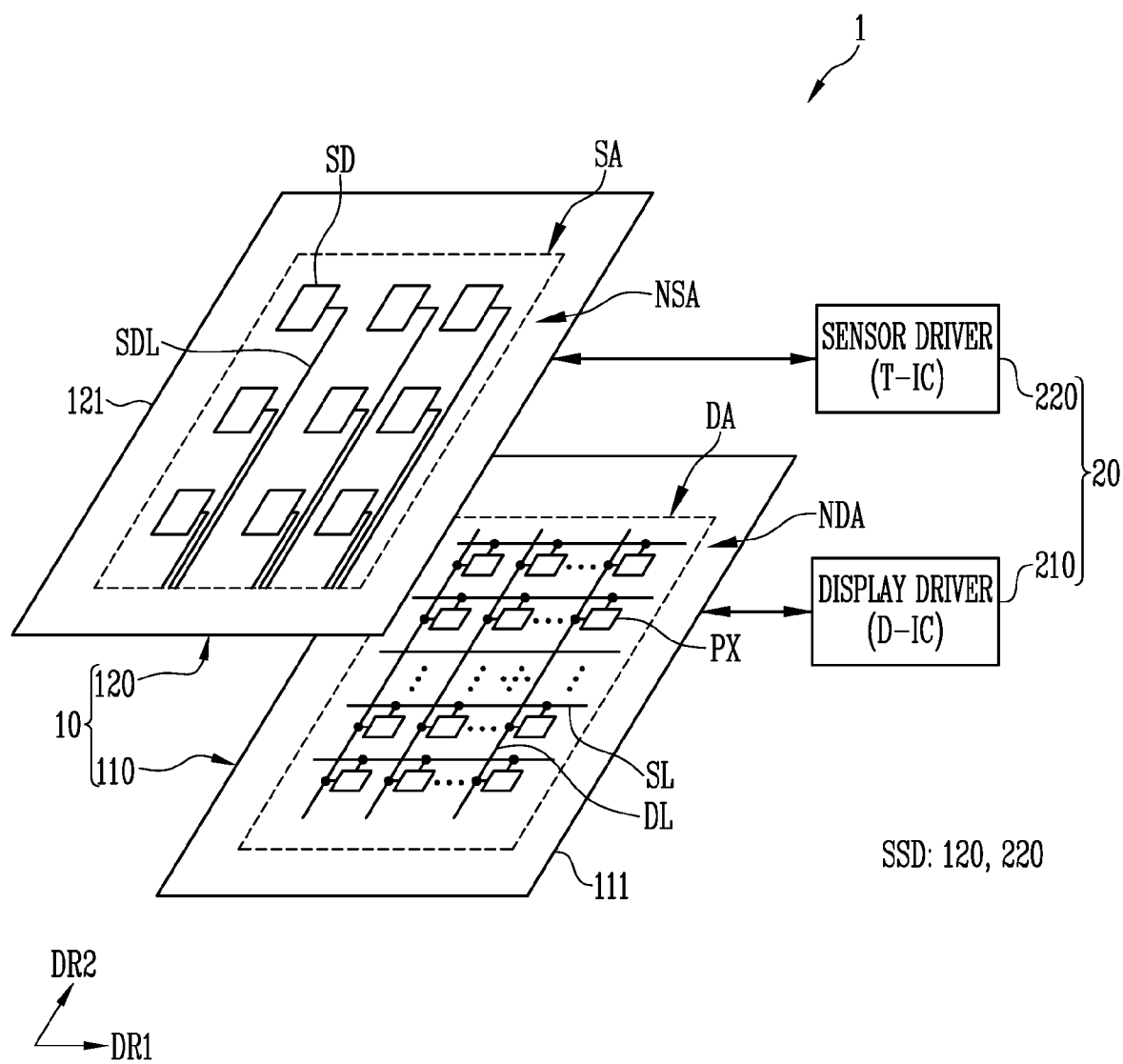
FIG. 1 is a diagram illustrating a display device in accordance with an embodiment of the present disclosure.

Hereinafter, embodiments of the present invention will be described in detail with reference to the attached drawings, such that those skilled in the art can easily implement the present invention. The present disclosure may be implemented in various forms, and is not limited to the embodiments described herein.

In the drawings, portions which are not related to the present disclosure will be omitted to explain the present disclosure more clearly. References are made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the present disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that can be tolerated by those skilled in the art. The other expressions may also be expressions from which the term "substantially" has been omitted.

Some embodiments are described in the accompanying drawings in connection with functional blocks, units and/or modules. Those skilled in the art will understand that such blocks, units, and/or modules are physically implemented by logic circuits, discrete components, microprocessors, hardwired circuits, memory elements, line connections, and other electronic circuits. This may be formed using semiconductor-based fabrication techniques or other fabrication techniques. For blocks, units, and/or modules implemented by a microprocessor or other similar hardware, they may be programmed and controlled using software to perform various functions discussed herein, and may be optionally driven by firmware and/or software. In addition, each block, unit, and/or module may be implemented by dedicated hardware, or be implemented by a combination of the dedicated hardware which performs some functions and a processor which performs different functions (e.g., one or more programmed microprocessors and related circuits). Furthermore, in some embodiments, blocks, units and/or modules may be physically separated into two or more individual blocks, units and/or modules which interact with each other without departing from the scope of the inventive concept. In some embodiments, blocks, units and/or modules may be physically combined into more complex blocks, units and/or modules without departing from the scope of the inventive concept.

The term "connection" between two components may embrace electrical connection and physical connection, but the present disclosure is not limited thereto. For example, the term "connection" used in description with reference to a circuit diagram may refer to electrical connection, and the term "connection" used in description with reference to a sectional view or a plan view may refer to physical connection.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure.

However, the present disclosure is not limited to the following embodiments and may be modified into various forms. Each embodiment to be described below may be implemented alone, or combined with at least another embodiment to make various combinations of embodiments.

FIG. 1 is a diagram illustrating a display device 1 in accordance with an embodiment of the present disclosure.

Referring to FIG. 1, the display device 1 in accordance with an embodiment of the present disclosure may be employed in electronic devices such as a computer, a laptop, a cellular phone, a smart phone, a personal digital assistants (PDA), a potable multimedia player (PMP), a digital TV, a digital camera, a potable game console, a navigation device, a wearable device, an internet of tings (IoT) device, an internet of everything (IoE) device, an e-book, a virtual reality (VR) device, an augmented reality (AR) device, a navigation device for vehicles, a videophone, a monitoring system, an automatic focus system, a tracking system, and a motion sensor system.

The display device 1 may include a panel 10, and a driving circuit component 20 configured to drive the panel 10.

The panel 10 may include a display component 110 (or a display panel) configured to display an image, and a sensor component 120 (or a sensor panel) configured to sense external input such as a touch, pressure, a fingerprint, hovering, or the like. For example, the panel 10 may include pixels PX, and sensors SD (or sensor cells, or sensor electrodes) located to overlap at least some of the pixels PX.

For example, the pixels PX may display an image during each display frame period. For example, the sensors SD may sense input from a user during each sensing frame period. The sensing frame period and the display frame period may be independent from each other, and may be different from each other. The sensing frame period and the display frame period may or may not be synchronized with each other. The sensor component 120 may form a sensor device SSD (or an input sensing device) along with the sensor driver 220.

In an embodiment, the display component 110 and the sensor component 120 may be separately fabricated, and may then be disposed and/or connected with each other such that at least respective portions thereof overlap each other. In an embodiment, the display component 110 and the sensor component 120 may be integrally fabricated. For example, the sensor component 120 may be directly formed on at least one substrate (e.g., an upper and/or lower substrate of the display panel, or a thin film encapsulation layer) that forms the display component 110, or other insulating layers or various functional layers (e.g., an optical layer or a passivation layer).

Although FIG. 1 illustrates that the sensor component 120 is disposed on a front surface of the display component 110 (e.g., an upper surface, on which an image is displayed), the position of the sensor component 120 is not limited thereto. For example, in an embodiment, the sensor component 120 may be disposed on a rear surface or on opposite surfaces of the display component 110. In an embodiment, the sensor component 120 may be disposed on a peripheral area of at least one side of the display component 110.

The display component 110 may include a display substrate 111 and a plurality of pixels PX formed on the display substrate 111. The pixels PX may be disposed in a display area DA of the display substrate 111.

The display substrate 111 may include the display area DA formed to display an image, and a non-display area NDA provided around the periphery of the display area DA. In an embodiment, the display area DA may be disposed in a central area of the display component 110, and the non-display area NDA may be disposed in the peripheral area of the display component 110 to enclose the display area DA.

The display substrate 111 may be a rigid substrate or a flexible substrate, and the material or properties thereof are not particularly limited. For example, the display substrate 111 may be a rigid substrate made of glass or reinforced glass, or a flexible substrate formed of a thin film made of plastic or metal.

Scan lines SL, data lines DL, and pixels PX connected to the scan lines SL and the data lines DL may be disposed in the display area DA. The pixels PX may be selected by scan signals each of which has a turn-on level, and which are supplied from the scan lines SL, may be supplied with data signals from the data lines DL, and may emit light having luminance corresponding to the data signals. Consequently, an image corresponding to the data signals is displayed on the display area DA. In the present disclosure, the structure of the pixels PX and the method of driving the pixels PX are not particularly limited. For example, each of the pixels PX may be implemented as a pixel that can employ various known structures and driving methods.

Various lines and/or an internal circuit component which are connected to the pixels PX of the display area DA may be disposed in the non-display area NDA. For example, a plurality of lines for supplying various power and control signals to the display area DA may be disposed in the non-display area NDA. In addition, the scan driver and the like may also be disposed in the non-display area NDA.

In the present disclosure, the type of the display component 110 is not particularly limited. For example, the display component 110 may be implemented as a self-emissive-type display panel such as an organic light emitting display panel. However, in the case where the display component 110 is implemented as a self-emissive type, the present disclosure is not limited to the case where each of the pixels PX includes only an organic light emitting element. For example, the light emitting element of each of the pixels PX may be formed of an organic light emitting diode, an inorganic light emitting diode, a quantum dot/well light emitting diode, or the like. In an embodiment, a plurality of light emitting elements may be provided in each of the pixels PX. Here, the plurality of light emitting elements may be connected in series, parallel, or series-parallel to each other. Alternatively, the display component 110 may be implemented as a non-emission type display panel such as a liquid crystal display panel. In the case in which the display component 110 is implemented as a non-emission type, the display device 1 may further include a light source such as a back-light unit.

The sensor component 120 may include a sensor substrate 121, and a plurality of sensors SD formed on the sensor substrate 121. The sensors SD may be disposed in a sensing area SA on the sensor substrate 121.

The sensor component 120 may include a sensor substrate 121, and a plurality of sensors SD formed on the sensor substrate 121. The sensors SD may be located in the sensing area SA on the sensor substrate 121. The sensors SD may be connected to sensor lines SDL. In the case where a touch sensor is formed in a self-capacitance sensing manner, the sensors SD and the sensor lines SDL may be connected on a one-to-one basis.

The sensor substrate 121 may be a rigid or flexible substrate, and may be formed of at least one insulating layer. Furthermore, the sensor substrate 121 may be a transparent or translucent light-transmissive substrate, but is not limited thereto. In other words, in the present disclosure, the material or properties of the sensor substrate 121 are not particularly limited. For example, the sensor substrate 121 may be a rigid substrate made of glass or reinforced glass, or a flexible substrate formed of a thin film made of plastic or metal. Furthermore, in an embodiment, at least one substrate (e.g., a display substrate 111, an encapsulation substrate and/or a thin film encapsulation layer) that forms the display component 110, or at least one insulating layer, functional layer, or the like that is disposed inside the display component 110 and/or an outer surface of the display component 110 may be used as the sensor substrate 121.

The sensor substrate 121 may include a sensing area SA capable of sensing external input, and a peripheral area NSA formed around the periphery of the sensing area SA. In an embodiment, the sensing area SA may be disposed to overlap at least one area of the display area DA. For example, the sensing area SA may be set to an area corresponding to the display area DA (e.g., an area overlapping the display area DA). The peripheral area NSA may be set to an area corresponding to the non-display area NDA (e.g., an area overlapping the non-display area NDA). In this case, when external input is provided on the display area DA, the external input may be detected by the sensor component 120.

The sensing area SA may be set to an area (i.e., an active area of the sensor) capable of responding to external input. To this end, the sensors SD for sensing external input may be disposed in the sensing area SA. For example, the sensors SD may be arranged in the form of a matrix based on a first direction DR1 and a second direction DR2 perpendicular to the first direction DR1. In an embodiment, the first direction DR1 and the second direction DR2 may not perpendicular to each other. In an embodiment, the sensors SD may be arranged in a circular or elliptical shape, or may be disposed in a diagonal direction, and the arrangement thereof is not limited to a matrix form. Each of the sensors SD may have various shapes such as a rectangular shape, a circular shape, and a mesh shape, and the shape of each of the sensors SD is not limited thereto.

In an embodiment, each of the sensors SD may include at least one of metal, transparent conductive material, and other various conductive materials, and may thus have conductivity. For example, the sensors SD may include at least one of various metals including gold (Au), silver (Ag), aluminum (Al), molybdenum (Mo), chrome (Cr), titanium (Ti), nickel (Ni), neodymium (Nd), copper (Cu), platinum (Pt), and the like, or an alloy thereof. Here, the sensors SD may have a mesh form.

Furthermore, the sensors SD may include at least one of various transparent conductive materials including silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), a carbon nanotube, and graphene. In addition, the sensors SD may include at least one of various conductive materials and thus have conductivity. Furthermore, each of the sensors SD may be formed of a single layer or multiple layers, and the cross-sectional structure thereof is not particularly limited.

The sensor lines SDL may be located in the same layer as the sensors SD. In an embodiment, the sensor lines SDL may be separated from the sensors SD by an insulating layer, and may be located in a layer different from that of the sensors SD. Here, the sensor lines SDL may be connected to the corresponding sensors SD through contact holes formed in the insulating layer. The sensor lines SDL may be formed of various conductive materials, and may be formed of material identical to or different from that of the sensors SD.

The driving circuit component 20 may include a display driver 210 configured to drive the display component 110, and a sensor driver 220 configured to drive the sensor component 120. Each of the display driver 210 and the sensor driver 220 may be implemented as an integrated circuit (IC) {e.g., a display integrated circuit (D-IC), or a sensor integrated circuit (T-IC)}.

The display driver 210 may be electrically connected to the display component 110, and may be configured to drive the pixels PX. For example, the display driver 210 may provide data signals to the pixels PX. In an embodiment, the display driver 210 may include a data driver and a timing controller, and the scan driver may be separately mounted in the non-display area NDA of the display component 110 (refer to FIG. 2). In an embodiment, the display driver 210 may include all or at least some of the data driver, the timing controller, and the scan driver.

The sensor driver 220 may be electrically connected to the sensor component 120, and may drive the sensor component 120. For example, the sensor driver 220 may be connected to the sensors SD by the sensor lines SDL. The sensor driver 220 may include a sensor receiver (or a receiver). In an embodiment, the sensor driver 220 may further include a sensor transmitter (or a transmitter). The sensor transmitter and the sensor receiver may be integrated into a single IC, but the present disclosure is not limited thereto.

Figure 2:
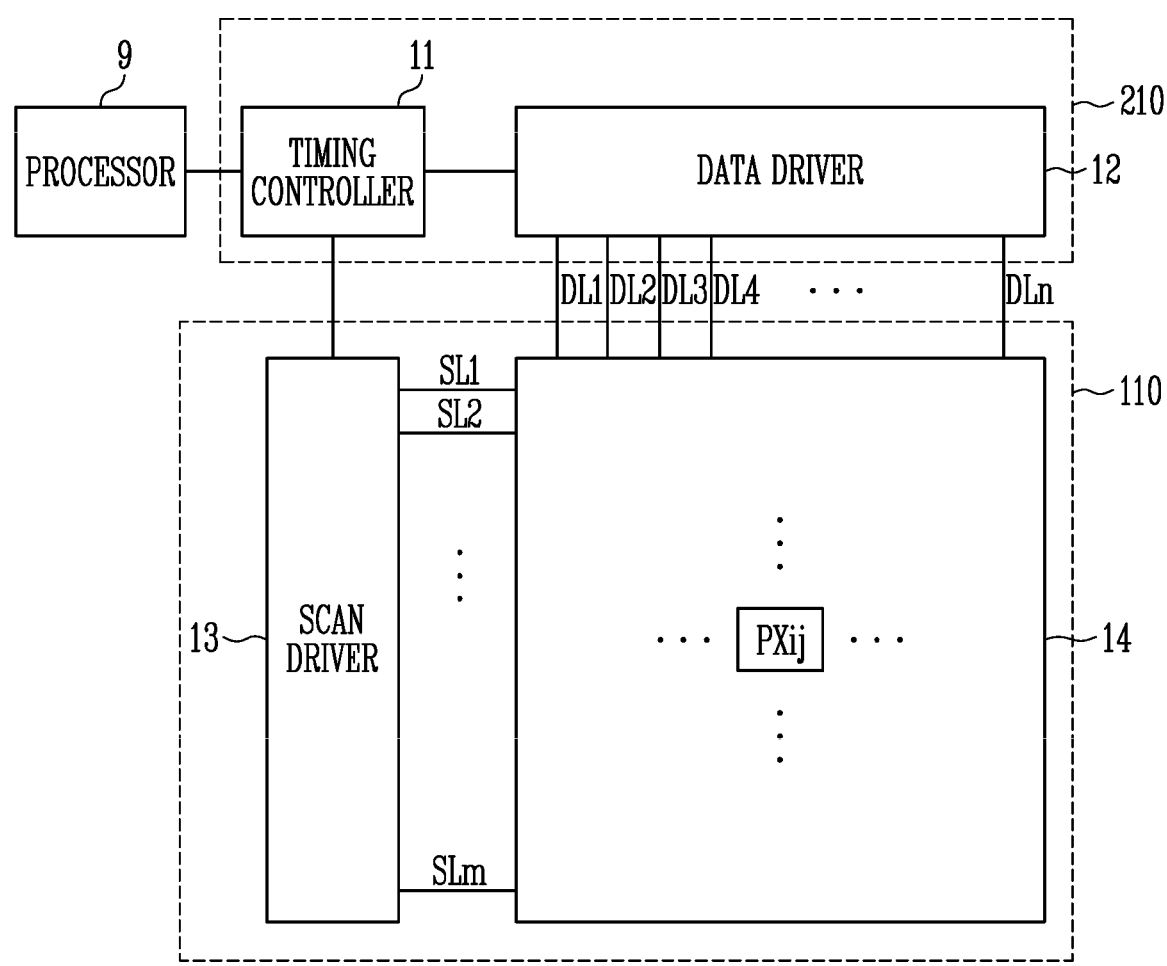
FIG. 2 is a diagram illustrating an embodiment of a display component and a display driver included in the display device of FIG. 1.

FIG. 2 is a diagram illustrating an embodiment of the display component 110 and the display driver 210 included in the display device 1 of FIG. 1.

Referring to FIGS. 1 and 2, the display driver 210 may include a data driver 12 and a timing controller 11. The display component 110 may include a scan driver 13. Here, as described above, the configuration of the foregoing function components pertaining to, for example, whether to integrate the foregoing function components on a single IC or a plurality of ICs or whether to mount the function components on a display substrate 111, may be changed in various ways depending on specifications of the display device 1.

The timing controller 11 may receive pieces of data and control signals for each frame from the processor 9. The processor 9 may correspond to a graphics processing unit (GPU), a central processing unit (CPU), an application processor (AP), or the like. The control signals may include a vertical synchronization signal, a horizontal synchronization signal, a data enable signal, and the like.

Each cycle of the vertical synchronization signal may correspond to each frame period. Each cycle of the horizontal synchronization signal may correspond to each horizontal period. The pieces of data may be supplied on a horizontal line basis in response to a pulse of an enable level of a data enable signal during each horizontal period. The horizontal line may refer to pixels (e.g., a pixel row) connected to the same scan line. The timing controller 11 may render the pieces of data in consideration of the specifications of the display device 1. For example, the processor may provide red data, green data, and blue data for each unit dot. For example, in the case where the pixel component 14 has an RGB stripe structure, pixels may correspond one-to-one to respective pieces of data. In this case, rendering of the pieces of data may be unnecessary. However, for example, in the case where the pixel circuit 14 has a PENTILE™ structure, because adjacent unit dots may share a pixel, the pixels may not correspond one-to-one to the respective pieces of data. In this case, rendering of the pieces of data may be necessary. Pieces of data that have been rendered or have not been rendered may be provided to the data driver 12. Furthermore, the timing controller 11 may provide a data control signal to the data driver 12. Furthermore, the timing controller 11 may provide a data control signal to the data driver 13.

The data driver 12 may generate, using the pieces of data and the data control signal that are received from the timing controller 11, data signals (i.e., data voltages) to be provided to data lines DL1, DL2, DL3, DL4, . . . , and DLn. Here, n is a positive integer.

The scan driver 13 may generate, using scan control signals (e.g., a clock signal, a scan start signal, and the like) received from the timing controller 11, scan signals to be provided to the scan lines SL1, SL2, . . . , and SLm. Here, m is a positive integer. The scan driver 13 may sequentially supply scan signals each having a turn-on level pulse to the scan lines SL1 to SLm. The scan driver 13 may include scan stages configured in the form of a shift register. The scan driver 13 may generate scan signals in such a way as to sequentially transmit a scan start signal having a turn-on level pulse to a subsequent scan stage under the control of a clock signal.

The pixel component 14 includes pixels. Each of the pixels may be connected to a corresponding data line and a corresponding scan line. For example, the pixel PXij may be connected to an i-th scan line and a j-th data line. The pixels may include pixels configured to emit a first color of light, pixels configured to emit a second color of light, and pixels configured to emit a third color of light. The first color, the second color, and the third color may be different colors. For example, the first color may be one of red, green, and blue. The second color may be one of red, green, and blue, other than the first color. The third color may be the remaining color among the red, green, and blue, other than the first color and the second color. Furthermore, magenta, cyan, and yellow, in lieu of red, green, and blue, may be used as the first to third colors.

Figure 3:
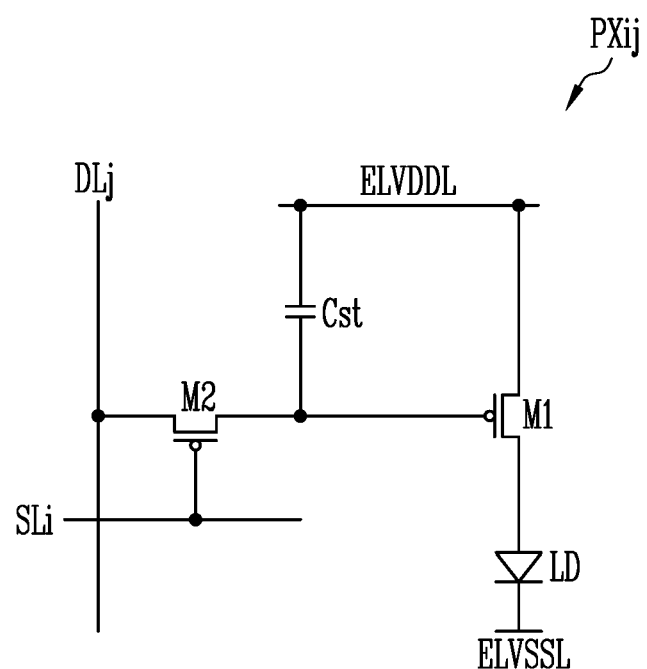
FIG. 3 is a diagram illustrating an embodiment of a pixel included in the display component of FIG. 2.

FIG. 3 is a diagram illustrating an embodiment of the pixel included in the display component of FIG. 2.

Referring to FIGS. 2 and 3, there is illustrated a pixel PXij. The other pixels may have substantially the same configuration as the pixel PXij; therefore, redundant explanation thereof will be omitted.

The first transistor M1 may include a gate electrode connected to a second electrode of the storage capacitor Cst, a first electrode connected to a first power line ELVDDL, and a second electrode connected to an anode of the light emitting element LD. The first transistor M1 may be referred to as a driving transistor.

The second transistor M2 may include a gate electrode connected to an i-th scan line SLi, a first electrode connected to a j-th data line DLj, and a second electrode connected to the second electrode of the storage capacitor Cst. The second transistor M2 may be referred to as a scan transistor.

A first electrode of the storage capacitor Cst may be connected to the first power line ELVDDL, and the second electrode thereof may be connected to the gate electrode of the first transistor M1. In other words, the storage capacitor Cst may be formed between the first power line ELVDDL and the gate electrode of the first transistor M1.

The anode of the light emitting element LD may be connected to the second electrode of the first transistor M1, and a cathode thereof may be connected to a second power line ELVSSL. The light emitting element LD may be a light emitting diode. As described above, the light emitting element LD may be formed of an organic light emitting element, an inorganic light emitting element, a quantum dot/well light emitting element, or the like. Furthermore, a plurality of light emitting elements may be provided in the pixel PXij. Here, the plurality of light emitting elements may be connected in series, parallel, or series-parallel to each other. During an emission period of the light emitting element LD, a first power voltage to be applied to the first power line ELVDDL may be greater than a second power voltage to be applied to the second power line ELVSSL.

Here, although the first and second transistors M1 and M2 each is formed of a P-type transistor, it will be understood to those skilled in this art that at least one transistor may be replaced with an N-type transistor by reversing the polarity of a signal.

If a scan signal of a turn-on level is applied to the i-th scan line SLi, the second transistor M2 may be turned on. Here, a data signal supplied from the j-th data line DLj may be stored in the storage capacitor Cst. The first transistor M1 allows driving current to flow in response to a gate-source voltage difference, which is maintained by the storage capacitor Cst. The driving current may flow along a path including the first power line ELVDDL, the first transistor M1, the light emitting element LD, and the second power line ELVSSL. The light emitting element LD may emit light at a luminance corresponding to the amount of driving current.

The structure and driving scheme of the pixel PXij may be changed in various ways. For example, the pixel PXij may further include other additional circuit elements such as a compensation transistor configured to compensate for the threshold voltage of the first transistor M1, an initialization transistor configured to initialize the gate electrode of the first transistor M1 and/or the anode electrode of the light emitting element LD, an emission control transistor configured to control a period during which driving current is supplied to the light emitting element LD, and/or a boosting capacitor configured to boost the voltage of the gate electrode of the first transistor M1.

Figure 4:
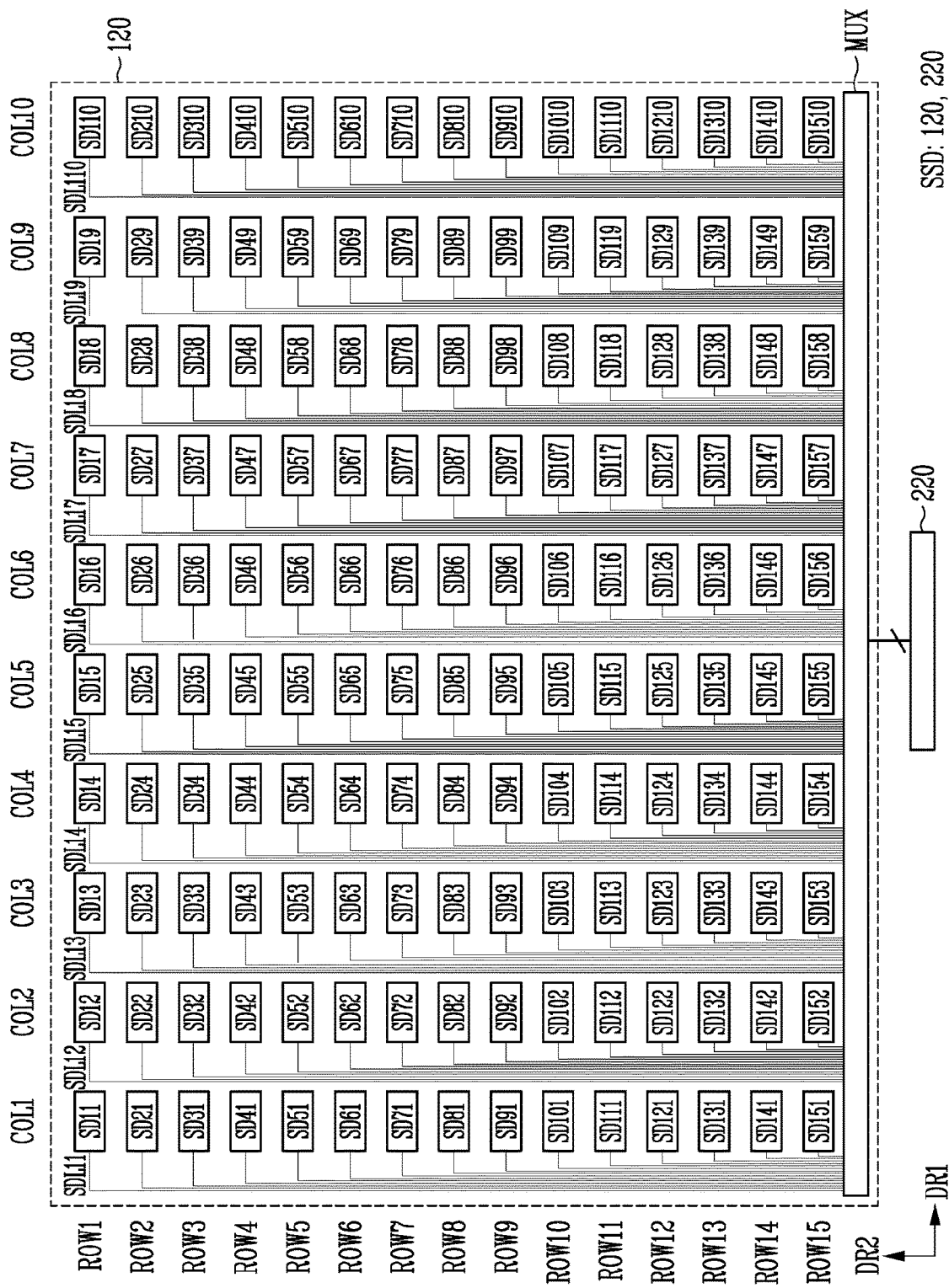
FIG. 4 is a diagram illustrating an embodiment of a sensor device included in the display device of FIG. 1.

FIG. 4 is a diagram illustrating an embodiment of the sensor device SSD included in the display device 1 of FIG. 1.

Referring to FIG. 4, the sensor device SSD may include a sensor component 120 and a sensor driver 220. The sensor device SSD may be included in the display device 1.

The sensor component 120 may include sensors SD11 to SD1510. "SDij" may indicate a sensor located on an i-th row and a j-th column. The sensors SD11 to SD1510 may be successively arranged in the first direction DR1 and the second direction DR2. For example, the sensors SD11 to SD1510 may be arranged in the form of a matrix. Hereinafter, for convenience of explanation, the sensor component 120 will be described as including sensors SD11 to SD1510 arranged along fifteen rows ROW11 to ROW15 and ten columns COL1 to COL10. However, the foregoing is only for illustrative purposes, and the size of the matrix is not limited thereto. The size of the matrix (or the number of sensors correspond thereto) may be changed in various ways depending on the specifications of the sensor device SSD.

The sensors SD11 to SD1510 may be connected to different sensor lines SDL11 to SDL110, . . . "SDLij" may indicate a sensor line connected to the sensor (i.e., SDij) located on the i-th row and the j-th column. Each of the sensor lines SDL11 to SDL110, . . . may extend in the second direction DR2, and may be connected to corresponding sensors among the sensors SD11 to SD1510.

The multiplexer MUX may be electrically connected to the sensor lines SDL11 to SDL110, . . . . Furthermore, the multiplexer MUX may be electrically connected to the sensor driver 220. The multiplexer MUX may select at least one of the sensor lines SDL11 to SDL110, . . . and electrically connect the selected sensor line to the sensor driver 220. For example, in the case where the sensor device SSD performs a sensing operation (or a scanning operation for sensing) on a row basis, the multiplexer MUX may select sensor lines connected to the sensors that are included in at least one row (or a specific row) among the sensors SD11 to SD1510, and may connect the selected sensor lines to the sensor driver 220. The multiplexer MUX may be provided in the sensor component 120, but is not limited thereto. The position of the multiplexer MUX may be changed in various ways within a range in which the multiplexer MUX can be electrically between the sensor lines SDL11 to SDL110, . . . and the sensor driver 220.

The sensor driver 220 may apply a reference signal to the sensors SD11 to SD1510 to store charges to the sensors SD11 to SD1510 or discharge the charges therefrom, and may sense a change in capacitance of each of the sensor SD11 to SD1510 to determine whether external input is present (or a location of the external input). The sensor driver 220 may determine whether external input to the sensor component 120 is present, in a self-capacitance manner.

Figure 5:
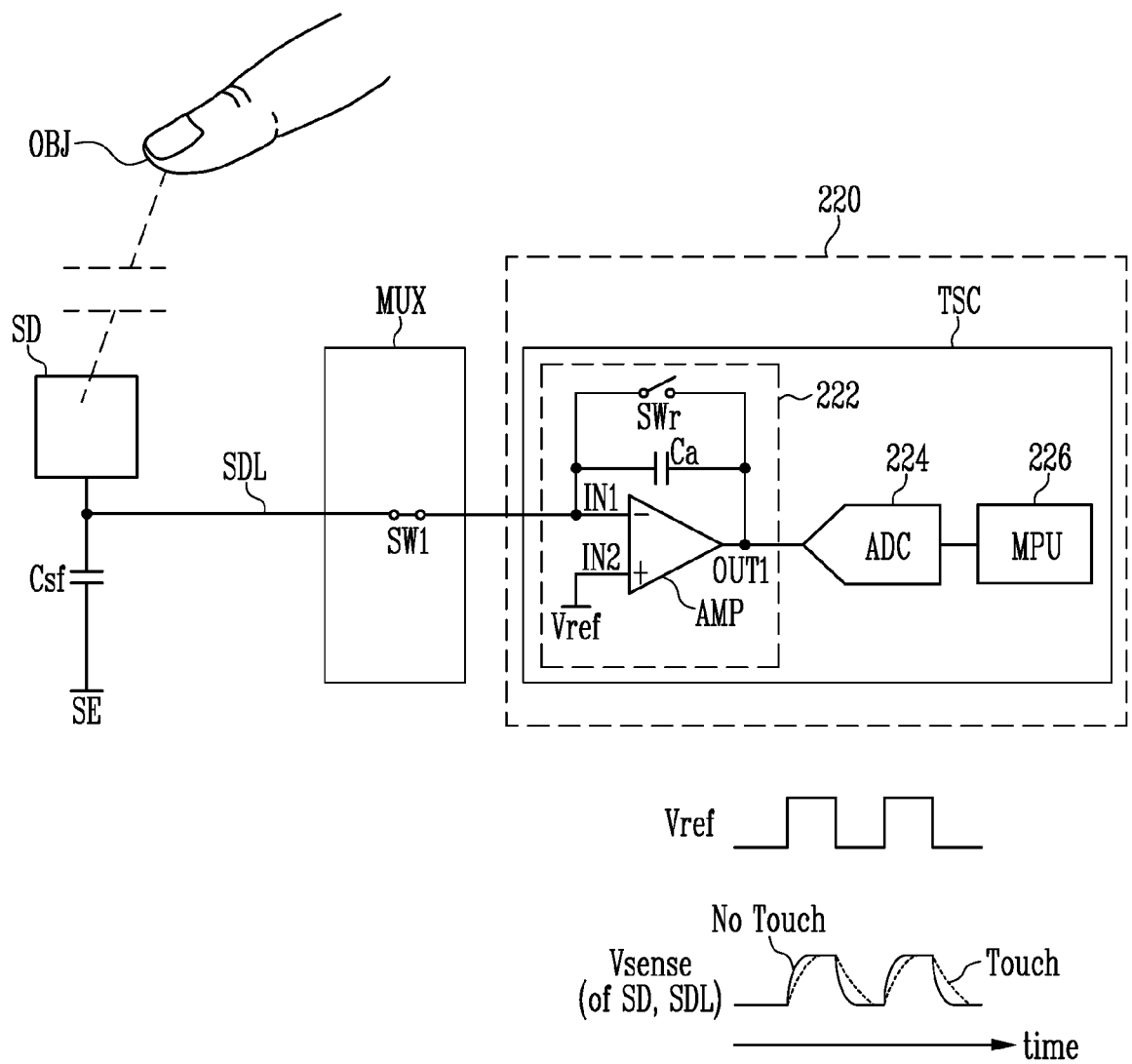
FIG. 5 is a diagram illustrating an embodiment of a sensor driver included in the sensor device of FIG. 4.
Figure 6:
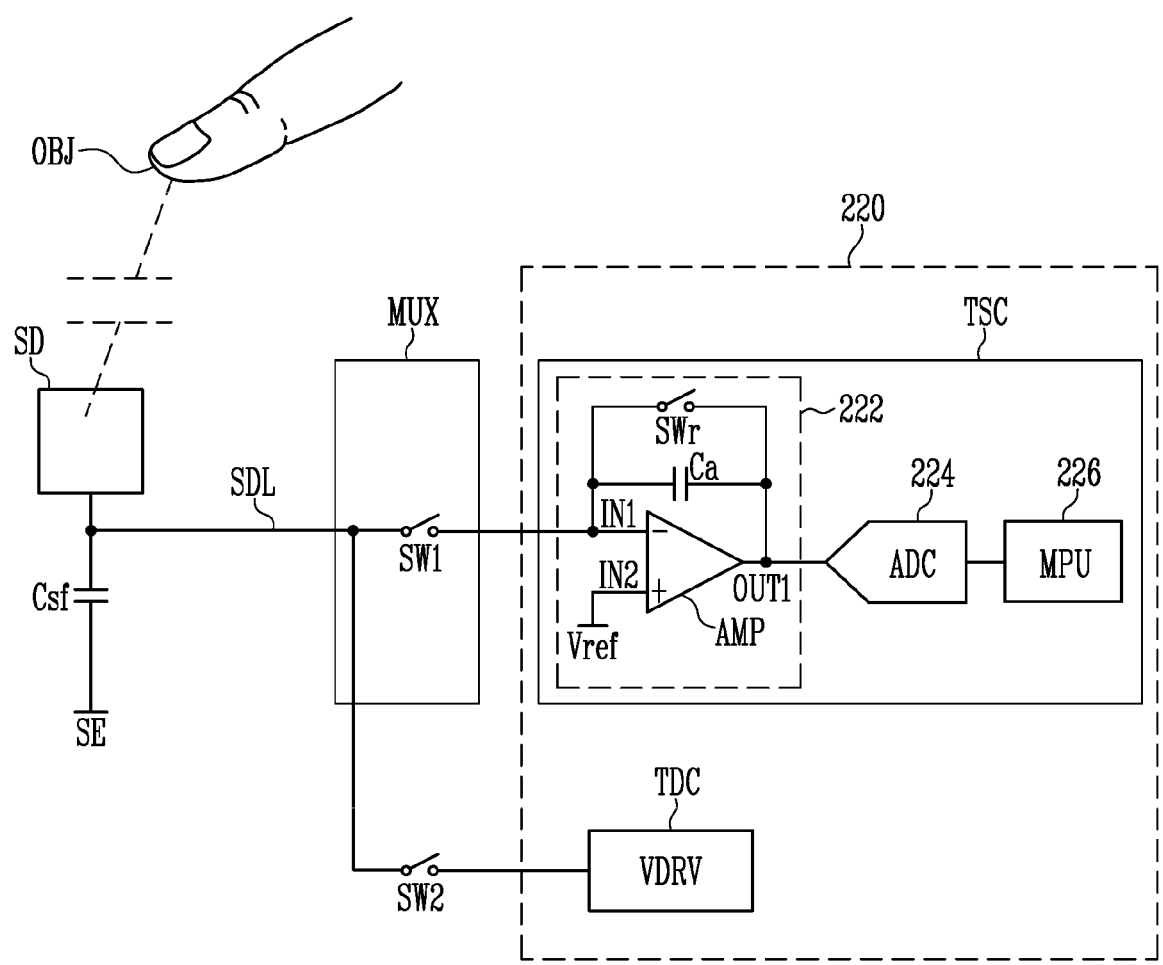
FIG. 6 is a diagram illustrating another embodiment of the sensor driver included in the sensor device of FIG. 4.

FIG. 5 is a diagram illustrating an embodiment of the sensor driver 220 included in the sensor device of FIG. 4. FIG. 6 is a diagram illustrating another embodiment of the sensor driver 220 included in the sensor device of FIG. 4. For convenience of explanation, FIGS. 5 and 6 further illustrate the sensor SD, the sensor line SDL, and the multiplexer MUX.

Referring to FIG. 5, the sensor driver 220 may include a sensor receiver TSC. The sensor receiver TSC may be provided on a column basis of FIG. 4. For example, a plurality of sensor receivers TSC, which respectively correspond to the columns COL1 to COL10 of FIG. 4, may be provided in the sensor driver 220. Hereinafter, description will be made based on a single sensor SD and a single sensor line SDL. The same description may also be applied to the other sensors and the other sensor lines of the sensor component 120.

The sensor SD and a support electrode SE may form a self-capacitance Csf. The support electrode SE may be one electrode of the display component 110. For example, in the case where the display component 110 is a self-emissive type display panel, the cathodes of the light emitting diodes of the pixels may correspond to the support electrode SE. In the case where the display component 110 is a non-emissive type display panel, a common electrode of the pixels may correspond to the support electrode SE. However, the self-capacitance Csf is not necessarily limited to a single electrode, but may include other electrodes that are adjacent to the sensor SD and are capable of forming a significant capacitance during a sensing process.

The multiplexer MUX may include a first switch SW1. The first switch SW1 may be connected between the sensor line SDL and the sensor driver 220.

The sensor receiver TSC may include a sensor channel 222. The sensor channel 222 may be configured to receive a sensing signal Vsense from the sensor line SDL during a first period in which the first switch SW1 is turned on. The sensor channel 222 may output a voltage signal having a voltage level corresponding to the amount of charges stored in the sensor SD to an output terminal OUT1. For example, the sensor channel 222 may be an integrator.

For example, the sensor channel 222 may include an amplifier AMP, a sensing capacitor Ca, and a reset switch SWr. The amplifier AMP may include a first input terminal IN1 connected to the sensor line SDL through the first switch SW1, a second input terminal IN2 configured to receive a reference signal Vref, and the output terminal OUT1. For example, the amplifier AMP may be an operational amplifier. For example, the first input terminal IN1 may be an inverting terminal, and the second input terminal IN2 may be a non-inverting terminal.

The sensing capacitor Ca may be located between the first input terminal IN1 and the output terminal OUT1. The reset switch SWr may be located between the first input terminal IN1 and the output terminal OUT1. The sensing capacitor Ca and the reset switch SWr may be connected in parallel between the first input terminal IN1 and the output terminal OUT1. In an embodiment, a resistor connected in parallel to the sensing capacitor Ca may be further provided in the sensor channel 222.

The reference signal Vref may have a square wave. In the case where the reference signal Vref is applied to the second input terminal INS2 of the amplifier AMP, a sensing signal Vsense corresponding to the reference signal Vref may be generated on the sensor SD (and the sensor line SDL). The sensing signal Vsense may have a waveform formed by RC delay of the reference signal Vref due to the self-capacitance Csf or the like. Depending on whether there is proximity of an object OBJ (e.g., whether a touch is present or not), the self-capacitance Csf of the sensor SD may vary, so that the waveform of the sensing signal Vsense may vary. For example, the object OBJ may be the finger of the user, or the like.

The sensor receiver TSC may further include an analog-to-digital converter (ADC) 224, and a processor 226 {or a micro processor unit (MPU)}. The ADC 224 may receive an output signal from the sensor channel 222. The ADC 224 may convert a level of an analog voltage outputted from the sensor channel 222 to a digital value and output the digital value. The processor 226 may receive an output signal of the ADC 224, and may use the received digital value to determine whether external input is present.

Referring to FIG. 6, the sensor driver 220 may further include a sensor transmitter TDC.

The multiplexer MUX may further include a second switch SW2 to control connection between the sensor line SDL and the sensor transmitter TDC. The second switch SW2 and the first switch SW1 may be connected to the same sensor line SDL.

The sensor transmitter TDC may supply a shield signal VDRV (or a boost signal) to the sensor line SDL during a second period in which the second switch SW2 is turned on. The second period may be different from the first period in which the first switch SW1 is turned on. The second period and the first period may not coincide with each other. The shield signal VDRV will be described later herein.

FIGS. 7A to 7C are diagrams illustrating an embodiment of the operation of the sensor device SSD. FIGS. 7A to 7C simply illustrate the sensors SD11 to SD1510 in the configuration of the sensor component 120.

Referring to FIGS. 7A to 7C, the sensor device SSD may perform a sensing operation using a reference signal Vref. The sensor device SSD may perform the sensing operation on a row basis. Operation on "a row basis" means one or more rows operate or are operated on at a time. For example, the sensors SD11 to SD110, SD21 to SD210, SD31 to SD310, SD41 to SD410, SD51 to SD510, SD61 to SD610, SD71 to SD710, SD81 to SD810, SD91 to SD910, SD101 to SD1010, SD111 to SD1110, SD121 to SD1210, SD131 to SD1310, SD141 to SD1410, or SD151 to SD1510 that are located on the same row may form a sensor group SD_G. Sensing operations may be performed in such a way that the reference signal Vref is supplied to the sensors SD11 to SS1510 in units of the sensor groups SD_G. For example, the sensor device SSD may perform the sensing operations sequentially, row by row, from a first row ROW1 to a fifteenth row ROW15.

In an embodiment, as illustrated in FIG. 7A, the sensor device SSD may supply the reference signal Vref to the sensors SD11 to SD110 located on the first row ROW1 and perform a sensing operation. Thereafter, as illustrated in FIG. 7B, the sensor device SSD may supply the reference signal Vref to the sensors SD21 to SD210 located on the second row ROW2 and perform a sensing operation. Subsequently, the sensor device SSD may sequentially supply the reference signal Vref to the sensors SD31 to SD310, SD41 to SD410, SD51 to SD510, SD61 to SD610, SD71 to SD710, SD81 to SD810, SD91 to SD910, SD101 to SD1010, SD111 to SD1110, SD121 to SD1210, SD131 to SD1310, and SD141 to SD1410 that are located on the third to fourteenth rows ROW3 to ROW14, and perform corresponding sensing operations. Thereafter, as illustrated in FIG. 7C, the sensor device SSD may supply the reference signal Vref to the sensors SD151 to SD1510 located on the fifteenth row ROW15 and perform a sensing operation.

Although in the foregoing description the sensing operations have been described as being sequentially performed on a row basis going from one side of the sensor component 120 to the opposite side, the sensing operations may be randomly performed in units of rows.

Figure 8A:
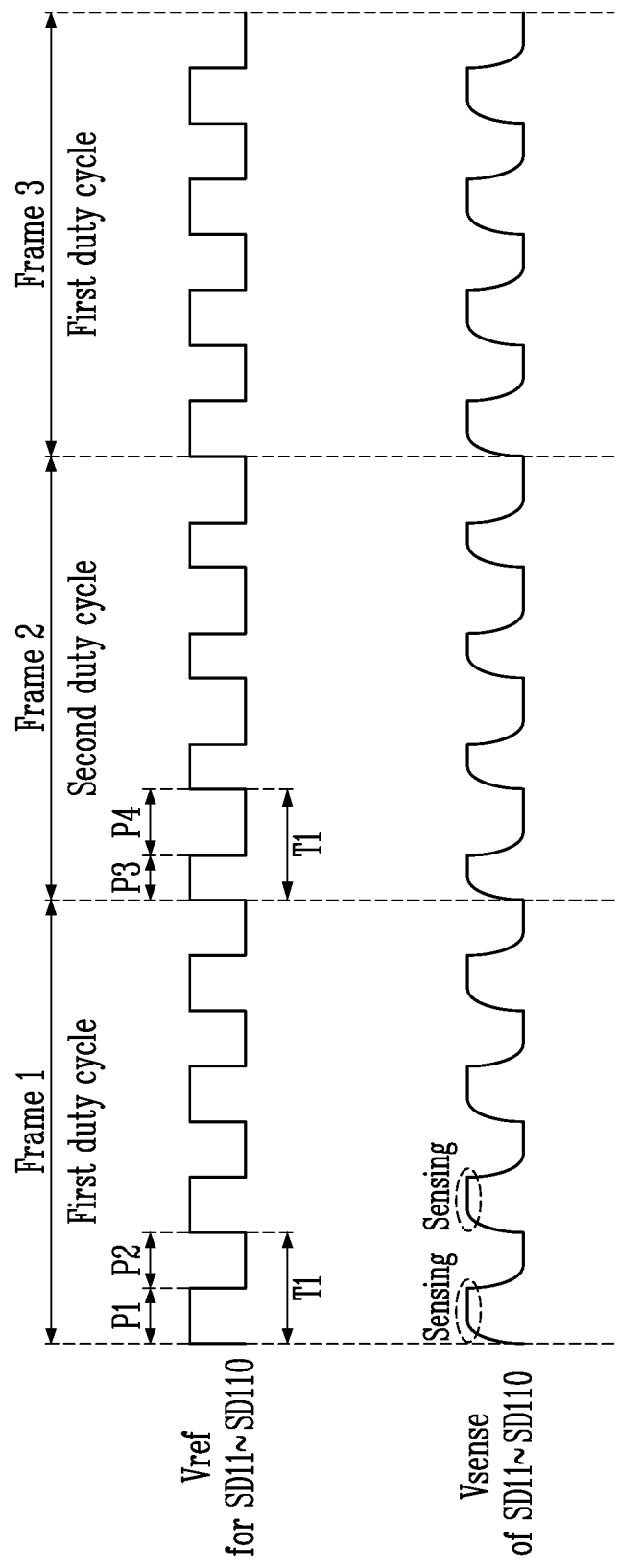
FIGS. 8A and 8B are diagrams illustrating an embodiment of a reference signal supplied in the sensor device and a sensing signal corresponding to the reference signal.
Figure 8B:
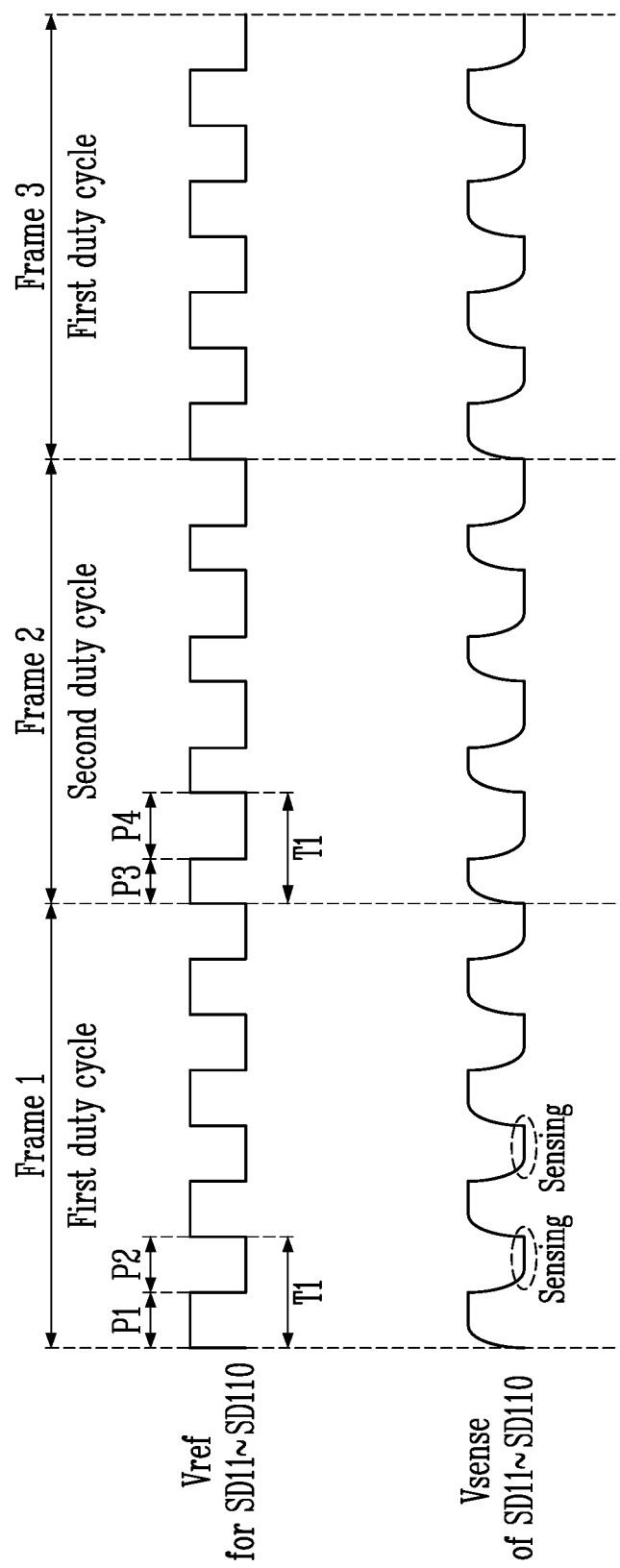
Figure 9A:
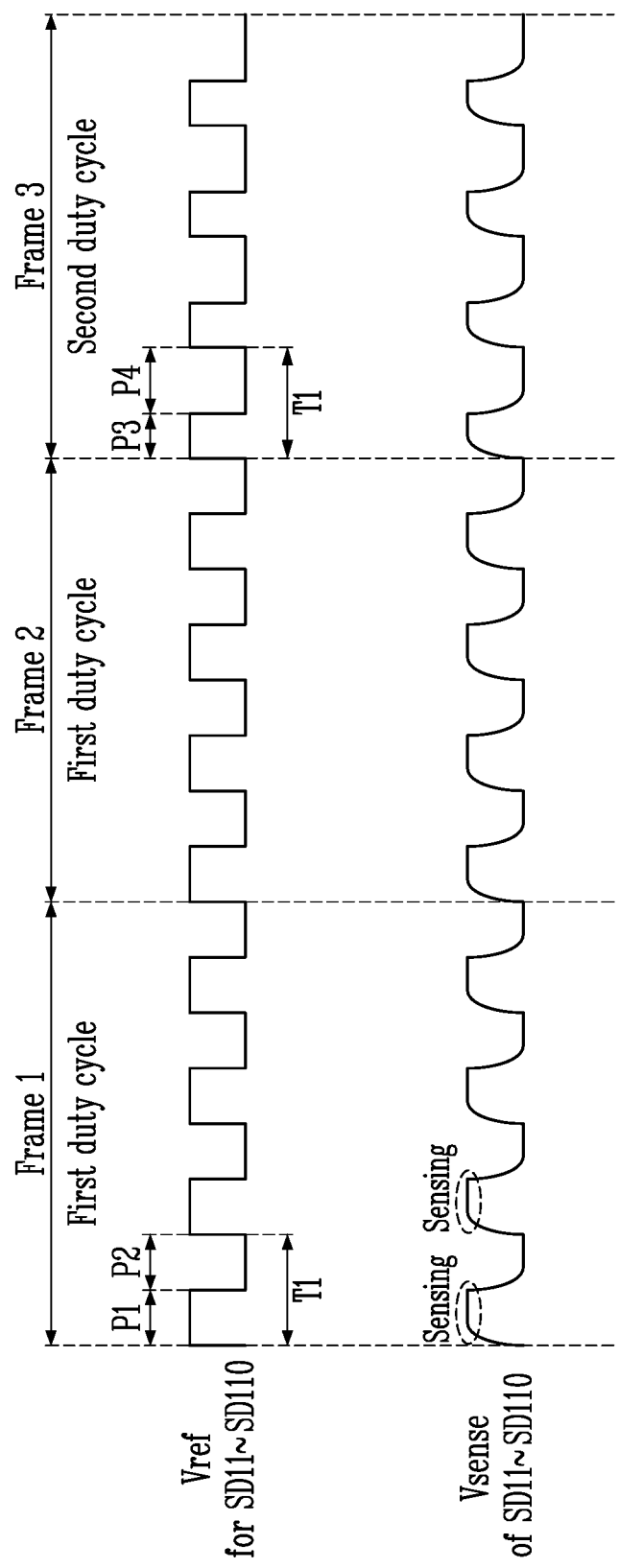
FIGS. 9A and 9B are diagrams illustrating an embodiment of a reference signal supplied in the sensor device and a sensing signal corresponding to the reference signal.
Figure 9B:
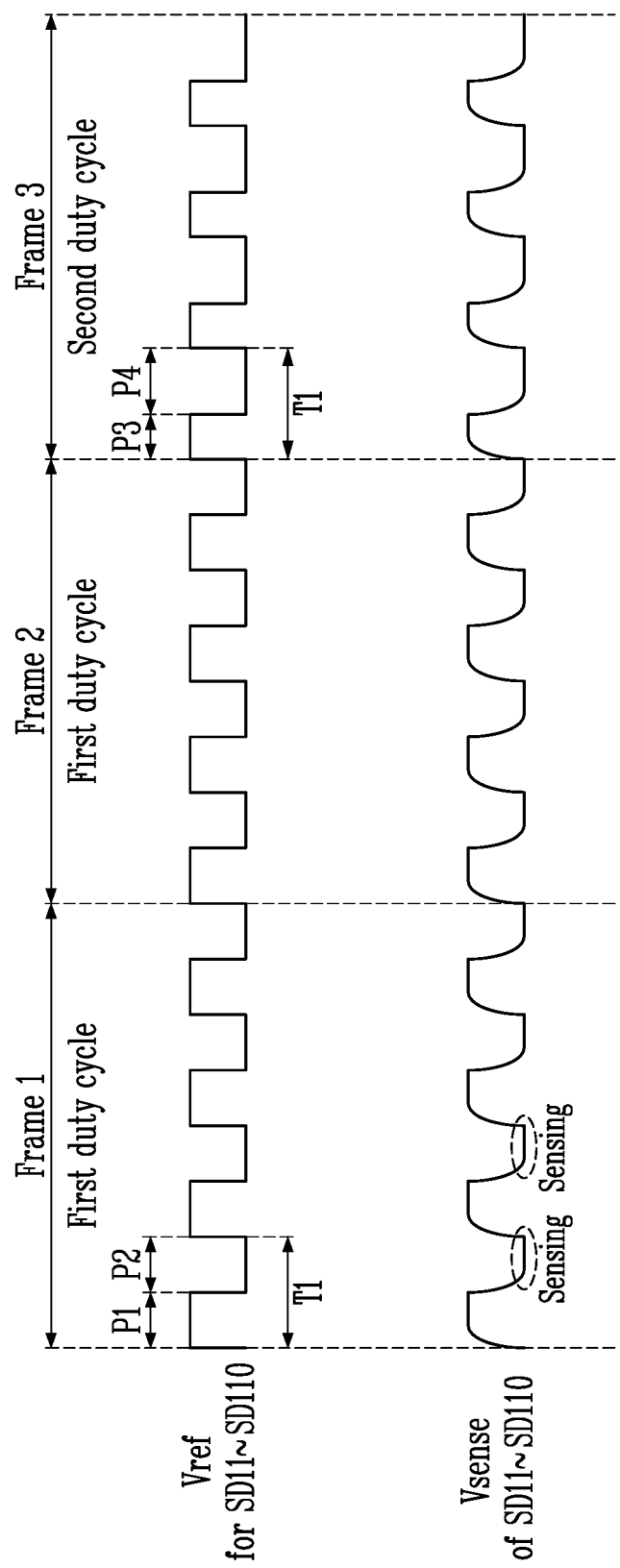

FIGS. 8A and 8B are diagrams illustrating an embodiment of a reference signal Vref supplied in the sensor device SSD and a sensing signal Vsense corresponding thereto. FIGS. 9A and 9B are diagrams illustrating an embodiment of a reference signal Vref to be supplied in the sensor device SSD and a sensing signal Vsense corresponding thereto.

FIGS. 8A to 9B each illustrate the reference signal Vref to be supplied to the sensors SD11 to SD110 located on the first row ROW1 and the sensing signal Vsense corresponding thereto. The sensors SD21 to SD1510 that are located on the second to fifteenth rows ROW2 to ROW15 may also be supplied with substantially the same reference signal Vref as the first row ROW1.

Referring to FIG. 8A, the sensor device SSD may supply the reference signal Vref to the sensors SD11 to SD110 located on the first row ROW, and may receive a sensing signal Vsense corresponding thereto and thus sense external input.

The reference signal Vref may be a square wave, and have an identical period T1 (or an identical frequency) regardless of a sensing frame. In an embodiment, the reference signal Vref may have the identical frequency regardless of the sensing frame, and may be set to have different duty cycles in units of sensing frames.

In an embodiment, the reference signal Vref may be set to have a first duty cycle in odd-numbered sensing frames Frame1, Frame3, . . . , and may be set to have a second duty cycle in even-numbered sensing frames Frame2, . . . . Here, the first duty cycle and the second duty cycle may be set to different duty cycles.

For example, the first duty cycle may be set to a duty cycle of 50%. In this case, the first portion P1 and the second portion P2 of a period T1 may be set to the same duration. For example, the second duty cycle may be set to a duty cycle of 40%. In this case, a third portion P3 may be set to a period corresponding to 40% of one period T1, and a fourth portion P4 may be set to a period corresponding to 60% of the one period T1.

For example, the sensor device SSD may supply the reference signal Vref having the first duty cycle to the sensors SD11 to SD110 during the first sensing frame Frame1, and may supply the reference signal Vref having the second duty cycle to the sensors SD11 to SD110 during the second sensing frame Frame2. A harmonic frequency when the reference signal Vref has the first duty cycle and a harmonic frequency when the reference signal Vref has the second duty cycle may be set to be different from each other. As such, in the case where the respective harmonic frequencies in the sensing frames are set to be different from each other, electromagnetic interference (EMI) in the sensor device SSD may be reduced. In other words, in an embodiment of the present disclosure, the EMI may be reduced without changing the frequency of the reference signal Vref.

In an embodiment, the sensor device SSD may perform a sensing operation (or a sampling operation) when the sensing signal Vsense increases and/or decreases.

For example, as illustrated in FIGS. 8A and 9A, a sensing operation may be performed during a period in which the level of the sensing signal Vsense increases (or increases and remains increased). For example, during the period in which the level of the sensing signal Vsense increases, the reset switch SWr in the sensor channel 222 remains turned off, so that a sampling operation for the sensing signal Vsense may be performed.

For example, as illustrated in FIGS. 8B and 9B, a sensing operation may be performed during a period in which the level of the sensing signal Vsense is low (or decreases and remains decreased). For example, during the period in which the level of the sensing signal Vsense is low, the reset switch SWr in the sensor channel 222 remains turned off, so that a sampling operation for the sensing signal Vsense may be performed.

Although, in the description pertaining to FIGS. 8A and 8B, the duty cycle has been described as being changed on one sensing frame basis, embodiments of the present disclosure are not limited thereto. For example, the duty cycle may be changed in units of one or more sensing frames. For example, the duty cycle may be changed in units of two or more sensing frames, as illustrated in FIGS. 9A and 9B.

In an embodiment, the sensor device SSD may supply the reference signal Vref having the first duty cycle to the sensors SD11 to SD110 during a first sensing frame Frame1 and a second sensing frame Frame2, and may supply the reference signal Vref having the second duty cycle to the sensors SD11 to SD110 during a third sensing frame Frame3 and a fourth sensing frame (not illustrated). As such, in the case where the duty cycle of the reference signal Vref is changed in units of at least two sensing frames, the EMI of the sensor device SSD may be reduced.

The following Table 1 illustrates the harmonic frequencies in the first duty cycle and the second duty cycle.

TABLE 1

| N | Duty 50%<br>$a_n$ | Duty 40%<br>$a_n$ |
|---|---|---|
| 0 | 0.5 | 0.4 |
| 1 | 0.6366 | 0.6055 |
| 2 | 0 | 0.1871 |
| 3 | −0.2122 | −0.1247 |
| 4 | 0 | −0.1514 |
| 5 | 0.1273 | −0.0000 |
| 6 | 0 | 0.1009 |
| 7 | −0.0909 | 0.0535 |

In Table 1, "an" denotes a harmonic frequency component, and "n" denotes an exponent. Referring to Table 1, in the case where the duty cycle is changed, the harmonic frequencies are set to be different from each other. In the case where the duty cycle is changed based on one or more sensing frames, the energy density is dispersed, thus resulting in improvement in EMI. In other words, in an embodiment of the present disclosure, the EMI may be improved by changing the duty cycle while maintaining the frequency.

FIGS. 10A and 10B are diagrams illustrating an embodiment of a reference signal Vref to be supplied in the sensor device SSD and a sensing signal Vsense corresponding thereto. FIGS. 11A and 11B are diagrams illustrating an embodiment of a reference signal Vref to be supplied in the sensor device SSD and a sensing signal Vsense corresponding thereto. FIGS. 12A and 12B are diagrams illustrating an embodiment of a reference signal Vref to be supplied in the sensor device SSD and a sensing signal Vsense corresponding thereto.

Referring to FIGS. 10A and 10B, the sensor device SSD may supply a reference signal Vref having a first duty cycle to the sensors SD11 to SD110 located on the first row ROW (or an odd-numbered row), and may receive a sensing signal Vsense corresponding thereto.

Thereafter, the sensor device SSD may supply a reference signal Vref having a second duty cycle to the sensors SD21 to SD210 located on the second row ROW (or an even-numbered row), and may receive a sensing signal Vsense corresponding thereto.

In other words, the sensor device SSD in accordance with the present disclosure may supply reference signals Vref having different duty cycles based on rows. In this case, the harmonic frequency may be set to be changed on a row basis, so that the EMI of the sensor drive SSD can be reduced.

In addition, although FIGS. 10A and 10B illustrate the case where a reference signal Vref having a different duty cycle is supplied to each row, embodiments of the present disclosure are not limited thereto. For example, a reference signal Vref having a third duty cycle different from the first duty cycle and the second duty cycle may be supplied to the sensors SD31 to SD310 located on the third row ROW. In other words, in the present disclosure, reference signals Vref having two or more different duty cycles may be sequentially supplied on a row basis.

Although, in the description pertaining to FIGS. 10A and 10B, the duty cycle has been described as being applied on a one-row basis, embodiments of the present disclosure are not limited thereto. For example, the duty cycle may be applied on an at-least-one-row basis. For example, the duty cycle may be changed every two rows, as illustrated in FIGS. 11A and 11B.

In an embodiment, the duty cycle of the reference signal Vref to be supplied to the same row may be changed on a sensing frame basis. As used herein, different duty cycles being applied "on at least one sensing frame basis" means the same duty cycle is applied to at least one whole sensing frame. For example, in a first sensing frame (or an odd-numbered sensing frame), as illustrated in FIG. 10A, a reference signal Vref having a first duty cycle may be supplied to the sensors SD11 to SD110 located on the first row ROW1. In a second sensing frame (or an even-numbered sensing frame), as illustrated in FIG. 12A, a reference signal Vref having a second duty cycle may be supplied to the sensors SD11 to SD110 located on the first row ROW1.

Likewise, in the first sensing frame (or the odd-numbered sensing frame), as illustrated in FIG. 10B, the reference signal Vref having the second duty cycle may be supplied to the sensors SD21 to SD210 located on the second row ROW2. In the second sensing frame (or the even-numbered sensing frame), as illustrated in FIG. 12B, the reference signal Vref having the first duty cycle may be supplied to the sensors SD21 to SD210 located on the second row ROW2.

Figure 14:
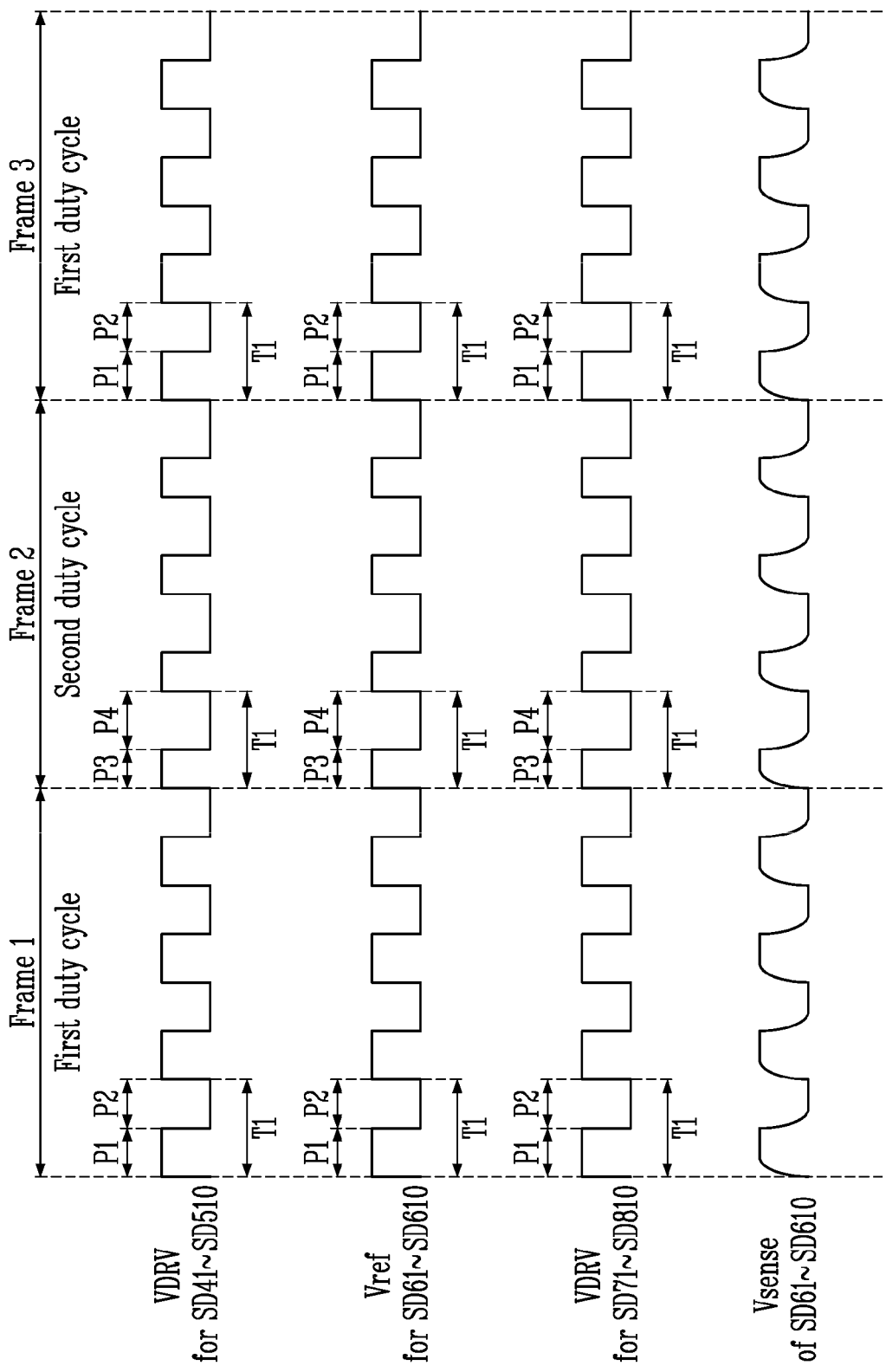
FIG. 14 is a diagram illustrating signals to be supplied in the sensor device 13.
Figure 16A:
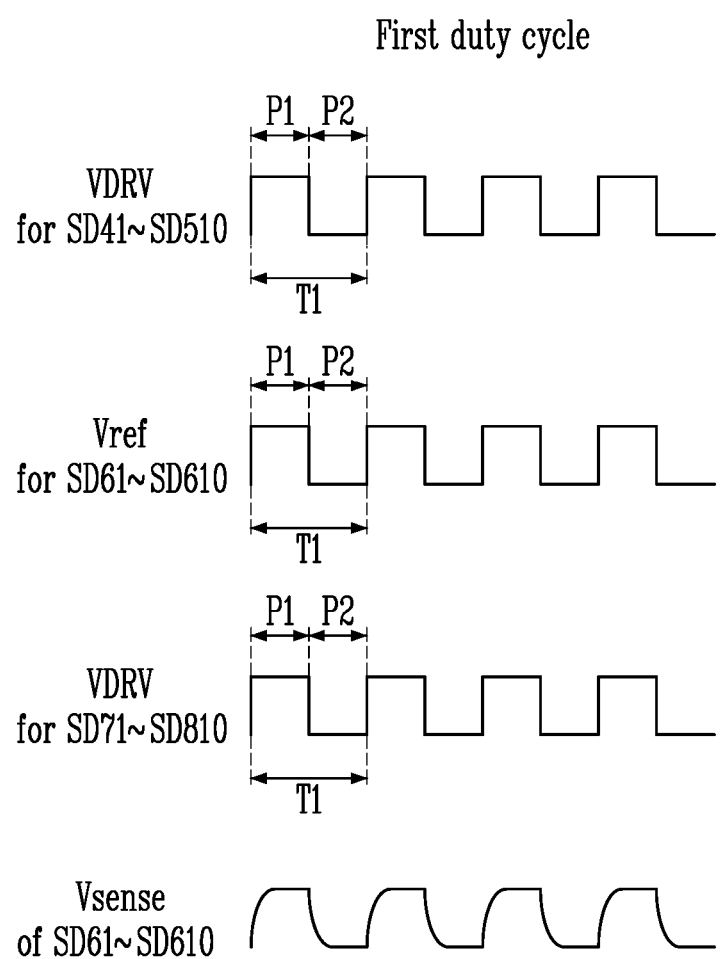
FIGS. 16A and 16B are diagrams illustrating signals to be supplied in the sensor device of FIGS. 13 and 15.
Figure 16B:
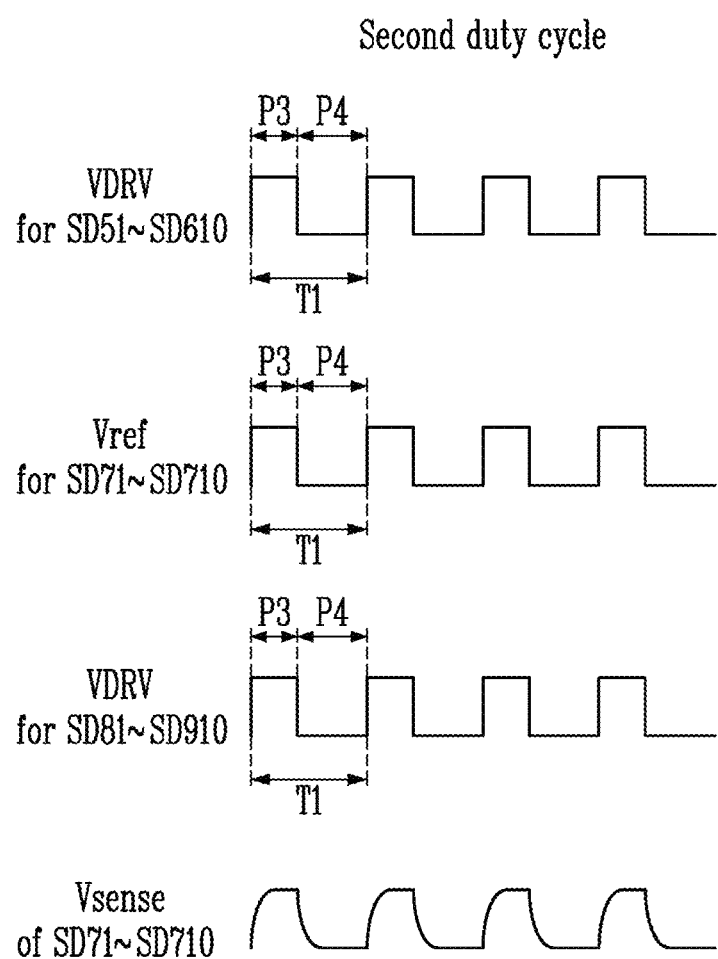

FIG. 13 is a diagram illustrating an embodiment of the operation of the sensor device SSD. FIG. 14 is a diagram illustrating signals to be supplied in the sensor device SSD of FIG. 13. FIG. 15 is a diagram illustrating an embodiment of the operation of the sensor device SSD. FIGS. 16A and 16B are diagrams illustrating signals to be supplied in the sensor device SSD of FIGS. 13 and 15.

Referring to FIG. 13, the embodiment of FIG. 13, except a shield signal VDRV, may be substantially identical or similar to the embodiments of FIGS. 7A to 12B. Therefore, redundant explanation will be omitted.

A shield signal VDRV may be applied to adjacent sensors SD_ADJ that are adjacent to a sensor group SD_G, which is a sensing target. Here, the adjacent sensors SD_ADJ may be the sensors SD41 to SD510 and SD71 to SD810 located on at least one row that is adjacent to the sensors SD61 to SD610 included in the sensor group SD_G (or sensors).

As illustrated in FIG. 14, the shield signal VDRV may have substantially the same waveform (or the same duty cycle) and the same phase as the reference signal Vref. For example, during the first sensing frame Frame1, the reference signal Vref having the first duty cycle may be supplied to the sensor group SD_G, and the shield signal VDRV having the first duty cycle may be supplied to the adjacent sensors SD_ADJ. For instance, during the second sensing frame Frame2, the reference signal Vref having the second duty cycle may be supplied to the sensor group SD_G, and the shield signal VDRV having the second duty cycle may be supplied to the adjacent sensors SD_ADJ.

If the shield signal VDRV is supplied to the adjacent sensors SD_ADJ during a period in which the reference signal Vref is supplied to the sensor group SD_G, capacitance between the sensor group SD_G and the adjacent sensors SD_ADJ may be substantially eliminated. Furthermore, the reference signal Vref may be boosted by the shield signal VDRV, so that a signal-to-noise ratio of the sensing signal Vsense may be enhanced. Hence, external input detecting performance of the sensor device SSD may be enhanced.

Although FIG. 14 illustrates that the duty cycle of the reference signal is changed on one-sensing-frame basis, the duty cycle may be changed after every two or more sensing frames and/or on at least one row basis, in embodiments of the present disclosure.

For example, as illustrated in FIG. 15, the sensor group SD_G that is a sensing target may be changed from the sensors located on the sixth row ROW6 of FIG. 13 to the sensors located on the seventh row ROW7. In this case, the sensors SD71 to SD710 located on the seventh row ROW7 may be set as the sensor group SD_G, and the reference signal Vref may be supplied to the sensor group SD_G. Here, the adjacent sensors SD_ADJ may be set to sensors located on at least one row adjacent to the sensors SD71 to SD710 included in the sensor group SD_G (or the sensors), for example, to the sensors SD51 to SD610 located on the fifth row ROW5 and the sixth row ROW6 and the sensors SD81 to SD910 located on the eighth row ROW8 and the ninth row ROW9. A shield signal VDRV having substantially the same waveform and phase as the reference signal Vref may be supplied to the adjacent sensors SD_ADJ.

As illustrated in FIGS. 13 and 16A, the duty cycles of the reference signal Vref and the shield signal VDRV that are to be supplied to the sensor group SD_G of the sixth row ROW6 and the adjacent sensors SD_ADJ may be set to the first duty cycle. As illustrated in FIGS. 15 and 16B, the duty cycles of the reference signal Vref and the shield signal VDRV that are to be supplied to the sensor group SD_G of the seventh row ROW7 and the adjacent sensors SD_ADJ may be set to the second duty cycle.

In other words, in embodiments of the present disclosure, the duty cycle of the reference signal Vref (and the shield signal VDRV) may be changed on at least one sensing frame basis and/or at least one row basis, so that the EMI may be reduced.

Figure 17:
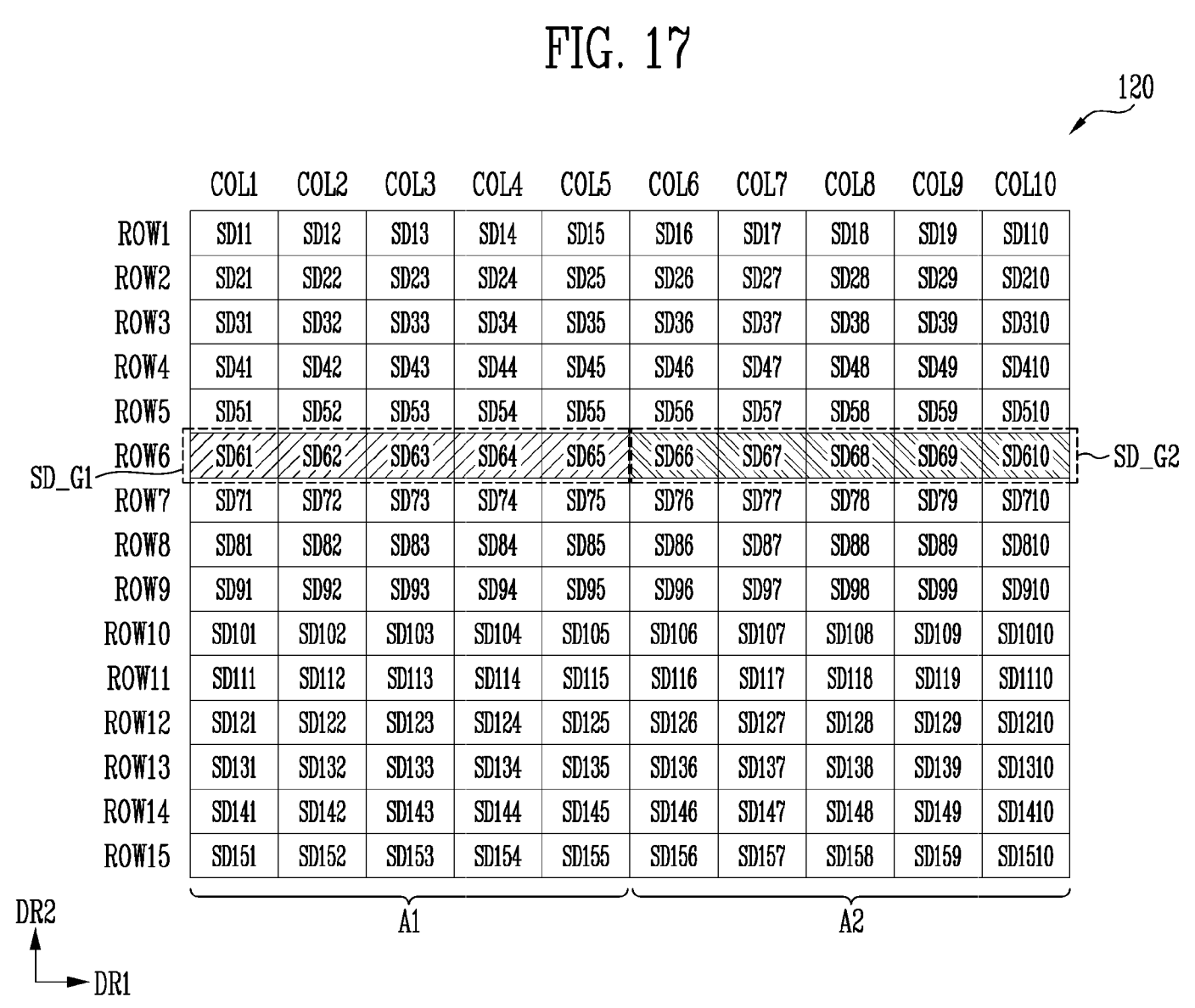
Figure 18:
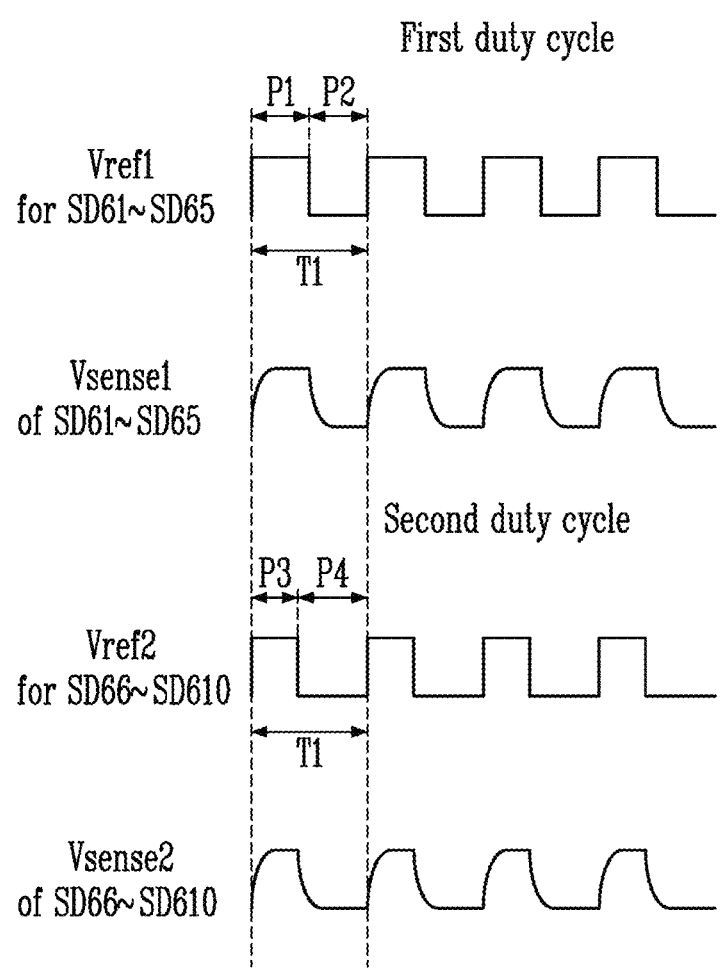
FIG. 18 is a diagram illustrating signals to be supplied in the sensor device of FIG. 17.

FIG. 17 is a diagram illustrating an embodiment of the operation of the sensor device SSD. FIG. 18 is a diagram illustrating signals to be supplied in the sensor device SSD of FIG. 17.

Referring to FIGS. 17 and 18, the sensor component 120 may be divided into a plurality of areas. For example, the sensor component 120 may be divided into a first area A1 and a second area A2. Sensors corresponding to first to fifth columns COL1 to COL5 may be located in the first area A1. Sensors corresponding to sixth to tenth columns COL6 to COL10 may be located in the second area A2. In other words, the first area A1 and the second area A2 may be defined by columns. However, the foregoing is only for illustrative purposes, and the first area A1 and the second area A2 are not limited thereto.

In an embodiment, the sensor device SSD (or the sensor driver 120) may perform a sensing operation using a first reference signal Vref1 on the first area A1, and may perform a sensing operation using a second reference signal Vref2 on the second area A2. Here, each of the first reference signal Vref1 and the second reference signal Vref2 may be the reference signal Vref of FIG. 5 or may be included in the reference signal Vref.

As illustrated in FIG. 18, the first reference signal Vref1 and the second reference signal Vref2 may be square waves and have the same magnitude (or the same voltage level) and the same cycle T1 (or the same frequency), and may differ from each other in duty cycle. For example, the first reference signal Vref1 may have the first duty cycle, and the second reference signal Vref2 may have the second duty cycle.

In the case where the first reference signal Vref1 and the second reference signal Vref2 having different duty cycles are simultaneously supplied to perform sensing operations, the harmonic frequency derived from the first reference signal Vref1 and the second reference signal Vref2 is dispersed, so that the EMI may be reduced.

In an embodiment, the sensor device SSD may perform, using the first reference signal Vref1, a sensing operation on the 61st to 65th sensors SD61 to SD65 (or a first sensor group SD_G1) included in the first area A1, and may simultaneously perform, using the second reference signal Vref2, a sensing operation on the 66th to 610th sensors SD66 to SD610 (or a second sensor group SD_G2) included in the second area A2.

In other words, the sensor device SSD may apply the first reference signal Vref1 to each of the 61st to 65th sensors SD61 to SD65 in the first area A1, and receive a first sensing signal Vsense1 from each of the 61st to 65th sensors SD61 to SD65. Likewise, the sensor device SSD may apply the second reference signal Vref2 to each of the 66th to 610th sensors SD66 to SD610 in the second area A2, and receive a second sensing signal Vsense2 from each of the 66th to 610th sensors SD66 to SD610.

As illustrated in FIG. 18, the first sensing signal Vsense1 may have a waveform corresponding to the first reference signal Vref1. The second sensing signal Vsense2 may have a waveform corresponding to the second reference signal Vref2. As the first reference signal Vref1 and the second reference signal Vref2 have different duty cycles, the first sensing signal Vsense1 and the second sensing signal Vsense2 may also have different duty cycles.

The duty cycles of the first reference signal Vref1 and the second reference signal Vref2 may be changed on at least one sensing frame basis and/or at least one row basis. Furthermore, a shield signal may be supplied to the sensors located on rows adjacent to the sensor groups SD_G1 and SD_G2. The related description has been made with reference to FIGS. 7A to 16A; therefore, redundant explanation will be omitted.

Although FIG. 17 illustrates that the sensor component 120 is divided into two areas, the present disclosure is not limited thereto. For example, the sensor component 120 may be divided into two or more areas, for example, three areas.

Figure 19:
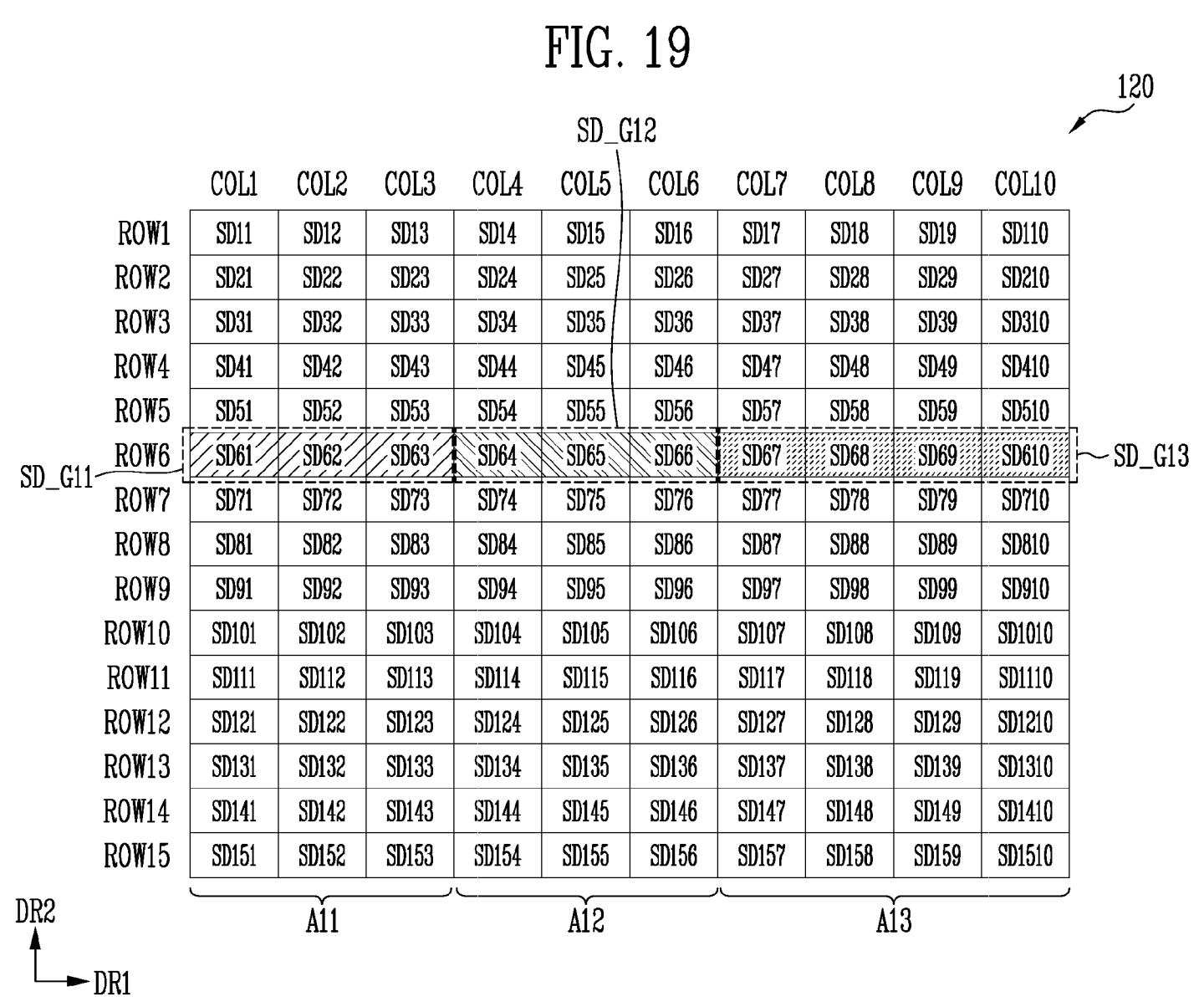
Figure 20A:
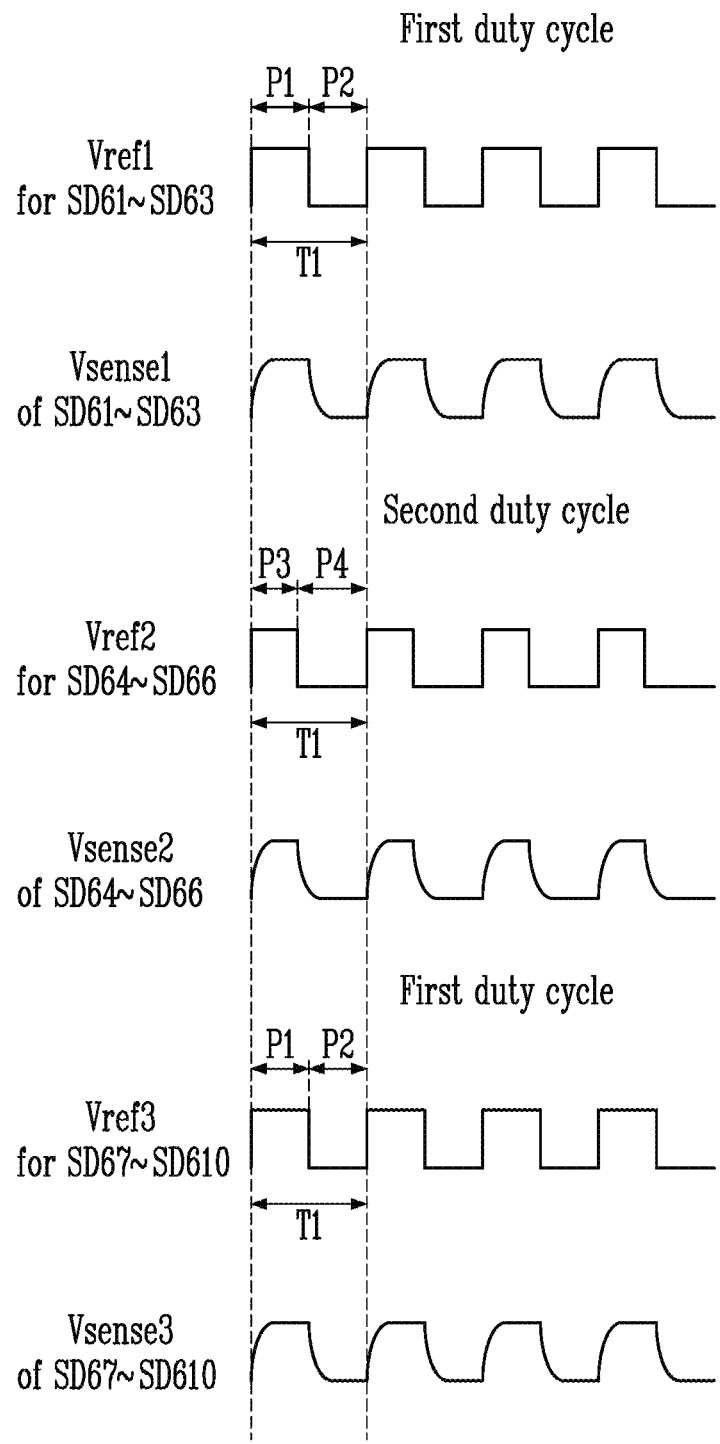
FIGS. 20A and 20B are diagrams illustrating signals to be supplied in the sensor device.
Figure 20B:
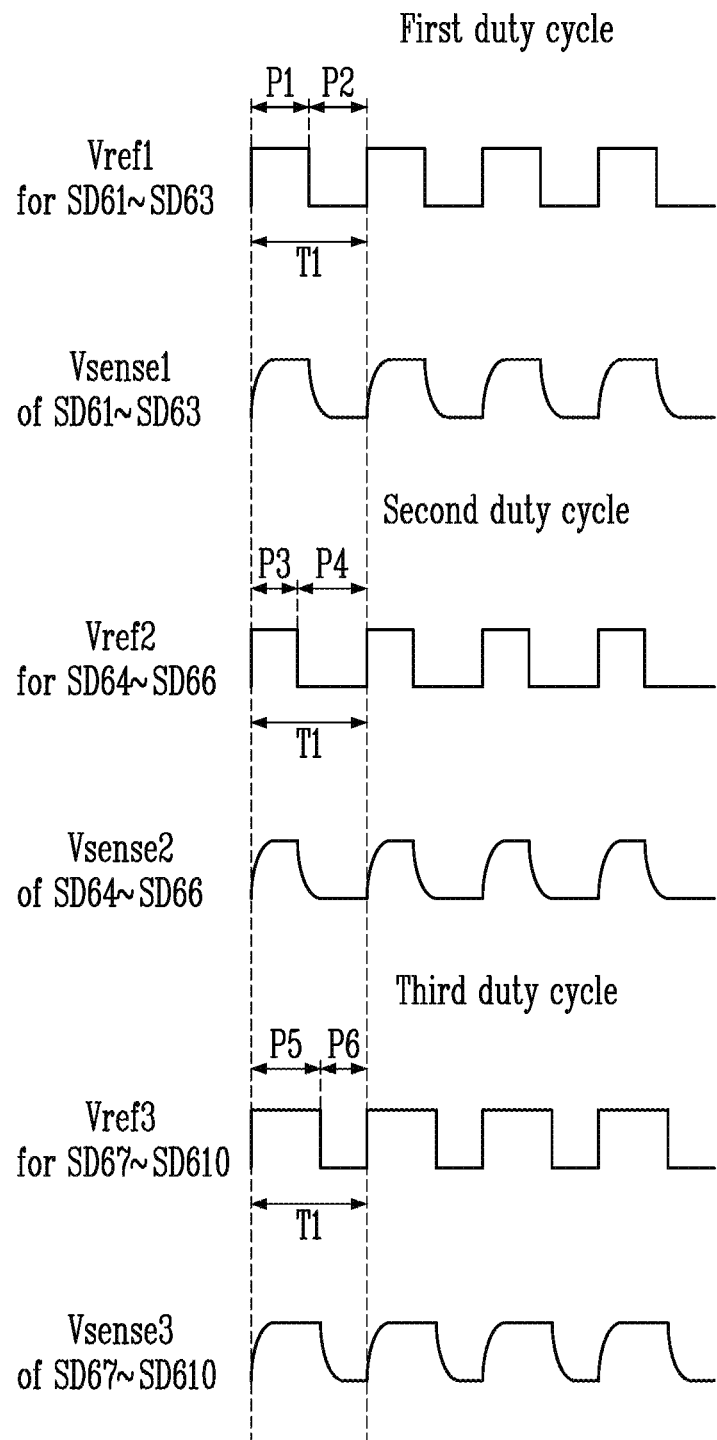

FIG. 19 is a diagram illustrating an embodiment of the operation of the sensor device SSD. FIGS. 20A and 20B are diagrams illustrating signals to be supplied in the sensor device SSD.

Referring to FIGS. 19 and 20B, the sensor component 120 may be divided into a plurality of areas. For example, the sensor component 120 may be divided into a first area A11, a second area A12, and a third area A13. The sensors that correspond to the first to third columns COL1 to COL3 may be located in the first area A11. The sensors that correspond to the fourth to sixth columns COL4 to COL6 may be located in the second area A12. The sensors that correspond to the seventh to tenth columns COL76 to COL10 may be located in the third area A13. In other words, the first area A11, the second area A12, and the third area A13 may be defined based on specific columns. However, the foregoing is only for illustrative purposes, and the first area A11, the second area A12, and the third area A13 are not limited thereto.

In an embodiment, the sensor device SSD (or the sensor driver 120) may perform a sensing operation using a first reference signal Vref1 on the first area A11, may perform a sensing operation using a second reference signal Vref2 on the second area A12, and may perform a sensing operation using a third reference signal Vref3 on the third area A13. Here, each of the first reference signal Vref1, the second reference signal Vref2, and the third reference signal Vref3 may be the reference signal Vref of FIG. 5 or may be included in the reference signal Vref.

As illustrated in FIGS. 20A and 20B, the first reference signal Vref1, the second reference signal Vref2, and the third reference signal Vref3 may be square waves, and may have the same magnitude (or the same voltage level) and the same cycle T1 (or the same frequency). In an embodiment, at least one reference signal of the first reference signal Vref1, the second reference signal Vref2, and the third reference signal Vref3 may have a duty cycle different from that of the other reference signals. For example, duty cycles to be supplied to adjacent areas may be different from each other.

In an embodiment, the duty cycles of the first reference signal Vref1 and the second reference signal Vref2, which are respectively supplied to the first area A11 and the second area A12 that are adjacent to each other, may be different from each other. Furthermore, the duty cycles of the second reference signal Vref2 and the third reference signal Vref3, which are respectively supplied to the second area A12 and the third area A13 that are adjacent to each other, may be different from each other.

For example, as illustrated in FIG. 20A, the first reference signal Vref1 may have a first duty cycle, the second reference signal Vref2 may have a second duty cycle, and the third reference signal Vref3 may have the first duty cycle. For example, as illustrated in FIG. 20B, the first reference signal Vref1 may have the first duty cycle, the second reference signal Vref2 may have the second duty cycle, and the third reference signal Vref3 may have a third duty cycle. For instance, the first duty cycle may be set to a duty cycle of 50%, the second duty cycle may be set to a duty cycle of 40%, and the third duty cycle may be set to a duty cycle of 60%. In this case, a third period P5 may be set to a period corresponding to 60% of one period T1, and a sixth period P6 may be set to a period corresponding to 40% of the one period T1.

In the case where the first reference signal Vref1, the second reference signal Vref2, and the third reference signal Vref3 having different duty cycles are simultaneously supplied to perform sensing operations on adjacent areas, the harmonic frequency derived from the first reference signal Vref1, the second reference signal Vref2, and the third reference signal Vref3 is dispersed, so that the EMI may be reduced.

In an embodiment, the sensor device SSD may perform, using the first reference signal Vref1, a sensing operation on the 61th to 63rd sensors SD61 to SD63 (or a first sensor group SD_G11) included in the first area A11. Simultaneously, the sensor device SSD may perform, using the second reference signal Vref2, a sensing operation on the 64th to 66th sensors SD64 to SD66 (or a second sensor group SD_G2) included in the second area A12. Simultaneously, the sensor device SSD may perform, using the third reference signal Vref3, a sensing operation on the 67th to 610th sensors SD67 to SD610 (or a third sensor group SD_G13) included in the third area A13.

In other words, the sensor device SSD may apply the first reference signal Vref1 to each of the 61th to 63rd sensors SD61 to SD63 in the first area A11, and receive a first sensing signal Vsense 1 from each of the 61th to 63th sensors SD61 to SD63. Likewise, the sensor device SSD may apply the second reference signal Vref2 to each of the 64th to 66th sensors SD64 to SD66 in the second area A12, and receive a second sensing signal Vsense2 from each of the 64th to 66th sensors SD64 to SD66. Likewise, the sensor device SSD may apply the third reference signal Vref3 to each of the 67th to 610th sensors SD67 to SD610 in the third area A13, and receive a third sensing signal Vsense3 from each of the 67th to 610th sensors SD67 to SD610.

The duty cycles of the first reference signal Vref1, the second reference signal Vref2, and the third reference signal Vref3 may be changed on at least one sensing frame basis and/or at least one row basis. Furthermore, a shield signal may be supplied to the sensors located on rows adjacent to the sensor groups SD_G11, SD_G12, and SD_G13. The related description has been made with reference to FIGS. 7A to 16A; therefore, redundant explanation will be omitted.

In a sensor device and a display device including the sensor device in accordance with an embodiment of the present disclosure, reference signals (or driving signals) having different duty cycles on a sensing frame and/or row basis are supplied, so that electromagnetic interference (EMI) can be reduced. Furthermore, in a sensor device and a display device including the sensor device in accordance with an embodiment of the present disclosure, a sensor panel may be divided into a plurality of areas, and reference signals having different duty cycles may be supplied to the respective areas, so that the EMI can be reduced.

However, effects of the present disclosure are not limited to the above-described effects, and various modifications are possible without departing from the spirit and scope of the present disclosure.

While embodiments of the present disclosure have been described above, those skilled in the art will appreciate that various modifications, additions and substitutions are possible, without departing from the scope and spirit of the present disclosure claimed in the appended claims.

What is claimed is:

1. A sensor device comprising:
   a sensor panel including sensors arranged in a matrix, and sensor lines electrically connected to each of the sensors, which is formed in a self-capacitance sensing manner, on a one-to-one basis; and
   a sensor driver configured to receive, using a reference signal having at least two or more duty cycles, sensing signals from the sensors through the sensor lines, the reference signal including a first reference signal and a second reference signal,
   wherein each of the sensors forms a self-capacitance with an electrode disposed in a display panel, and
   wherein sensors arranged on a first row receive the first reference signal having a first duty cycle during a first sensing frame period, and the sensors arranged on the first row receive the second reference signal having a second duty cycle, which is different from the first duty cycle, during a second sensing frame period.

2. The sensor device according to claim 1,
   wherein the first reference signal having the first duty cycle and the second reference signal having the second duty cycle are square waves, and are set to have an identical period and an identical frequency.

3. The sensor device according to claim 1, wherein the sensor driver receives the sensing signals from the sensors on a row basis.

4. The sensor device according to claim 1, wherein the sensor driver receives the sensing signals using the reference signal having different duty cycles on at least one sensing frame basis.

5. The sensor device according to claim 4, wherein the sensor driver receives the sensing signals using the first reference signal having the first duty cycle during the first sensing frame period, and receives the sensing signals using the second reference signal having the second duty cycle during the second sensing frame period.

6. The sensor device according to claim 4,
wherein the sensor driver applies a shield signal to adjacent sensors located on a row adjacent to a row from which the sensing signals are received, and
wherein the shield signal has same waveform and phase as the reference signal supplied to the row from which the sensing signals are received.

7. The sensor device according to claim 1,
wherein, during the first sensing frame period, sensors arranged on the first row receive the first reference signal having the first duty cycle, and sensors arranged on a second row receive the second reference signal having the second duty cycle, and
wherein, during the second sensing frame period, the sensors arranged on the first row receive the second reference signal having the second duty cycle, and the sensors arranged on the second row receive the first reference signal having the first duty cycle.

8. The sensor device according to claim 7,
wherein the sensor driver applies a shield signal to adjacent sensors located on a row adjacent to a row from which the sensing signals are received, and
wherein the shield signal has same waveform and phase as the reference signal supplied to the row from which the sensing signals are received.

9. The sensor device according to claim 7, wherein, during the first sensing frame period,
the sensing signals are received from the sensors located on an odd-numbered row, using the first reference signal having the first duty cycle, and
the sensing signals are received from the sensors located on an even-numbered row, using the second reference signal having the second duty cycle different from the first duty cycle.

10. The sensor device according to claim 9, wherein, during the second sensing frame period,
the sensing signals are received from the sensors located on the odd-numbered row, using the second reference signal having the second duty cycle, and
the sensing signals are received from the sensors located on the even-numbered row, using the first reference signal having the first duty cycle.

11. The sensor device according to claim 1,
wherein the sensor panel includes a first area and a second area, and
wherein the sensor driver receives the sensing signals from the sensors in the first area and the second area, using reference signals having different duty cycles.

12. The sensor device according to claim 11, wherein the first area and the second area are defined by specific columns.

13. The sensor device according to claim 1, wherein the sensor driver comprises:
an amplifier including a first input terminal electrically connected to one sensor line among the sensor line, a second input terminal to which the reference signal is to be applied, and an output terminal; and
a capacitor and a switch electrically connected in parallel between the first input terminal and the output terminal of the amplifier, and
wherein a sensing signal corresponding to the reference signal is generated on the one sensor line among the sensor lines.

14. A display device, comprising:
a display panel configured to display an image;
a sensor panel disposed on the display panel, the sensor panel including sensors arranged in a matrix having at least two rows and at least two columns, and sensor lines electrically connected to the sensors on a one-to-one basis; and
a sensor driver configured to receive, using a reference signal having at least two or more duty cycles, sensing signals from the sensors through the sensor lines, the reference signal including a first reference signal and a second reference signal,
wherein sensors arranged on a first row receive the first reference signal having a first duty cycle during a first sensing frame period, and the sensors arranged on the first row receive the second reference signal having a second duty cycle, which is different from the first duty cycle, during a second sensing frame period.

15. The display device according to claim 14,
wherein the first reference signal having the first duty cycle and the second reference signal having the second duty cycle are square waves, and are set to have an identical period and an identical frequency.

16. The display device according to claim 15,
wherein the sensor driver receives the sensing signals using the first reference signal having the first duty cycle during the first sensing frame period, and
wherein the sensor driver receives the sensing signals using the second reference signal having the second duty cycle during the second sensing frame period.

17. The display device according to claim 15, wherein, during the first sensing frame period, the sensor driver receives the sensing signals from the sensors located on the first row using the first reference signal having the first duty cycle, and receives the sensing signals from the sensors located on a second row using the second reference signal having the second duty cycle.

18. The display device according to claim 17, wherein, during the second sensing frame period, the sensor driver receives the sensing signals from the sensors located on the first row, using the second reference signal having the second duty cycle, and receives the sensing signals from the sensors located on the second row, using the first reference signal having the first duty cycle.

19. The display device according to claim 15,
wherein the sensor driver applies a shield signal to adjacent sensors located on a row adjacent to a row from which the sensing signals are received, and
wherein the shield signal has same waveform and phase as the reference signal.

20. The display device according to claim 15,
wherein the sensor panel is divided into a first area and a second area, and wherein the sensor driver receives the sensing signals from the sensors in the first area and the second area, using reference signals having different duty cycles.

\* \* \* \* \*